US010697357B2

(12) United States Patent
Clarke et al.

(10) Patent No.: US 10,697,357 B2
(45) Date of Patent: *Jun. 30, 2020

(54) CROSS-PORT AIR FLOW TO REDUCE PUMPING LOSSES

(71) Applicant: Bright Acceleration Technologies LLC, Sheboygan Falls, WI (US)

(72) Inventors: James R. Clarke, Levering, MI (US); Richard J. Fotsch, Sheboygan Falls, WI (US); C. Thomas Sylke, Whitefish Bay, WI (US)

(73) Assignee: Bright Acceleration Technologies LLC, Sheboygan Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,134

(22) Filed: May 23, 2019

(65) Prior Publication Data
US 2019/0277186 A1    Sep. 12, 2019

Related U.S. Application Data

(63) Continuation of application No. 15/977,903, filed on May 11, 2018, now Pat. No. 10,302,008, which is a
(Continued)

(51) Int. Cl.
*F02B 27/02* (2006.01)
*F02B 37/22* (2006.01)
(Continued)

(52) U.S. Cl.
CPC ........ *F02B 37/007* (2013.01); *F02B 27/0242* (2013.01); *F02B 37/22* (2013.01);
(Continued)

(58) Field of Classification Search
CPC .... F02B 37/007; F02B 27/0242; F02B 37/22; F02D 9/109; F02D 31/003;
(Continued)

(56) References Cited

U.S. PATENT DOCUMENTS

| 2,583,430 A | 1/1952 | Guercken |
| 3,232,042 A | 2/1966 | Sarra |

(Continued)

FOREIGN PATENT DOCUMENTS

JP    60-249616 A    12/1985

OTHER PUBLICATIONS

BorgWarner, "Design and Function of a Turbocharger: Turbine," 3 pages, 2015.

(Continued)

*Primary Examiner* — J. Todd Newton

(57) ABSTRACT

Cross-port air flow that improves engine fuel economy and reduces pumping losses during part-throttle operation can be implemented in various types of internal combustion engine systems using ports that interconnect the intake ports of different cylinders, thus allowing different cylinders to share combustion air. Cross-port air flow is commenced during part-throttle engine operation to disrupt the primary combustion air flow from each throttle to its associated cylinder, which reduces charge density and engine power. The engine compensates for the reduced power by incrementally opening the throttles, thus increasing the primary combustion air flow, reducing pumping losses and improving fuel economy.

14 Claims, 10 Drawing Sheets

Related U.S. Application Data continuation-in-part of application No. 15/724,834, filed on Oct. 4, 2017, now Pat. No. 10,309,296, which is a continuation of application No. 15/467,708, filed on Mar. 23, 2017, now Pat. No. 10,087,823, which is a continuation of application No. 15/254,138, filed on Sep. 1, 2016, now Pat. No. 9,638,095.

(51) Int. Cl.
| | |
|---|---|
| *F02B 37/007* | (2006.01) |
| *F02D 9/10* | (2006.01) |
| *F02D 31/00* | (2006.01) |
| *F02D 41/00* | (2006.01) |

(52) U.S. Cl.
CPC ........... *F02D 9/109* (2013.01); *F02D 9/1095* (2013.01); *F02D 31/003* (2013.01); *F02D 41/0002* (2013.01); *F02D 2200/101* (2013.01); *F02D 2200/1002* (2013.01); *F02D 2200/1006* (2013.01); *F02D 2200/501* (2013.01); *Y02T 10/144* (2013.01)

(58) Field of Classification Search
CPC ............... F02D 41/0002; F02D 9/1095; F02D 2200/1002; F02D 2200/1006; F02D 2200/101; F02D 2200/501; F02D 31/005; Y02T 10/144
USPC .......................................................... 60/612
See application file for complete search history.

(56) References Cited

U.S. PATENT DOCUMENTS

| | | | |
|---|---|---|---|
| 3,505,983 A | 4/1970 | Hartel | |
| 3,698,371 A | 10/1972 | Mitsuyama et al. | |
| 3,824,971 A | 7/1974 | Skatsche et al. | |
| 4,125,015 A | 11/1978 | Nunzio et al. | |
| 4,228,655 A | 10/1980 | Herschmann et al. | |
| 4,264,535 A | 4/1981 | Kikura | |
| 4,300,504 A | 11/1981 | Tezuka | |
| 4,400,944 A | 8/1983 | Iwamoto et al. | |
| 4,427,087 A | 1/1984 | Inoue et al. | |
| 4,432,205 A | 2/1984 | Inoue et al. | |
| 4,502,435 A | 3/1985 | Tadokoro et al. | |
| 4,520,775 A | 6/1985 | Nakamura | |
| 4,627,396 A | 12/1986 | Yoshida | |
| 4,630,446 A | 12/1986 | Iwai et al. | |
| 4,860,709 A | 8/1989 | Clarke et al. | |
| 4,993,227 A | 2/1991 | Nagura et al. | |
| 5,063,899 A | 11/1991 | Hitomi et al. | |
| 5,467,748 A | 11/1995 | Stockhausen | |
| 5,488,827 A | 2/1996 | Helmich et al. | |
| 5,642,698 A * | 7/1997 | Diehl ..................... | F02B 29/02 123/184.42 |
| 5,649,512 A | 7/1997 | Flanery, Jr. et al. | |
| 5,653,202 A | 8/1997 | Ma | |
| 5,775,283 A | 7/1998 | Sawai et al. | |
| 5,852,994 A | 12/1998 | Tsuzuku et al. | |
| 5,884,478 A | 3/1999 | Edmonds, Jr. | |
| 5,957,096 A | 9/1999 | Clarke et al. | |
| 6,170,443 B1 | 1/2001 | Hofbauer | |
| 6,279,320 B1 | 8/2001 | Mailander | |
| 6,324,847 B1 | 12/2001 | Pierpont | |
| 6,550,247 B1 | 4/2003 | Gladden | |
| 6,722,344 B2 | 4/2004 | Ashida et al. | |
| 6,925,971 B1 | 8/2005 | Peng et al. | |
| 6,957,632 B1 | 10/2005 | Carlson et al. | |
| 7,258,104 B2 | 8/2007 | Young et al. | |
| 7,302,929 B2 | 12/2007 | Kondo | |
| 7,712,311 B2 | 5/2010 | Ren et al. | |
| 7,886,530 B2 | 2/2011 | Winsor et al. | |
| 7,921,648 B2 | 4/2011 | Eitel et al. | |
| 7,937,941 B2 | 5/2011 | Nau et al. | |
| 8,151,567 B2 | 4/2012 | Rollinger et al. | |
| 8,176,735 B2 | 5/2012 | Komatsu | |
| 8,210,136 B2 | 7/2012 | Howard | |
| 8,256,213 B2 | 9/2012 | Kuhlbach et al. | |
| 8,266,906 B2 | 9/2012 | Wu | |
| 8,316,639 B2 | 11/2012 | Takahashi et al. | |
| 8,333,071 B2 | 12/2012 | Oakley et al. | |
| 8,336,309 B2 | 12/2012 | McEwan et al. | |
| 8,359,859 B2 | 1/2013 | Shiraishi | |
| 8,371,266 B1 | 2/2013 | Ulrey et al. | |
| 8,442,743 B2 | 5/2013 | Massard et al. | |
| 8,499,726 B2 | 8/2013 | Cox | |
| 8,499,747 B2 | 8/2013 | Schmalzl | |
| 8,544,268 B2 | 10/2013 | Begin | |
| 8,567,191 B2 | 10/2013 | Geyer | |
| 8,572,961 B2 | 11/2013 | Karnik et al. | |
| 8,596,252 B2 | 12/2013 | Liu et al. | |
| 8,683,799 B2 | 4/2014 | Azuma | |
| 8,713,937 B2 | 5/2014 | Pursifull et al. | |
| 8,733,088 B2 | 5/2014 | Reinhart et al. | |
| 8,733,318 B2 | 5/2014 | Roche et al. | |
| 8,746,191 B2 | 6/2014 | Elfner et al. | |
| 8,747,788 B1 | 6/2014 | Baig et al. | |
| 8,783,029 B2 | 7/2014 | Viglid et al. | |
| 8,793,999 B2 | 8/2014 | Rebhan et al. | |
| 8,806,869 B2 | 8/2014 | Petrovic | |
| 8,813,494 B2 | 8/2014 | Hofer et al. | |
| 8,820,071 B2 | 9/2014 | Tkac | |
| 8,844,282 B2 | 9/2014 | Jaegle et al. | |
| 8,863,514 B2 | 10/2014 | Joergl et al. | |
| 8,881,522 B2 | 11/2014 | Jebasinski et al. | |
| 8,915,081 B2 | 12/2014 | Hayman et al. | |
| 8,955,485 B2 | 2/2015 | Kulkarni | |
| 8,984,878 B2 | 3/2015 | Grosch et al. | |
| 8,991,177 B2 | 3/2015 | Rutschmann et al. | |
| 8,997,487 B2 | 4/2015 | Drangel et al. | |
| 9,002,619 B2 | 4/2015 | Ito et al. | |
| 9,021,806 B2 | 5/2015 | Kuhlbach et al. | |
| 9,027,539 B2 | 5/2015 | Miyashita | |
| 9,145,858 B2 | 9/2015 | Maceroni et al. | |
| 9,447,754 B1 * | 9/2016 | Clarke .................. | F02B 75/02 |
| 9,638,095 B1 * | 5/2017 | Clarke .................. | F02B 11/10 |
| 2002/0124566 A1 | 9/2002 | Kapich | |
| 2004/0020205 A1 | 2/2004 | Mailander | |
| 2005/0169764 A1 | 8/2005 | Heyes et al. | |
| 2006/0021347 A1 | 2/2006 | Sun et al. | |
| 2009/0038309 A1 | 2/2009 | Cocca et al. | |
| 2010/0122530 A1 | 5/2010 | French | |
| 2012/0090320 A1 | 4/2012 | Kuhlbach et al. | |
| 2012/0279215 A1 | 11/2012 | Roth et al. | |
| 2013/0167527 A1 | 7/2013 | Cattani et al. | |
| 2013/0233289 A1 | 9/2013 | Mailander | |
| 2014/0150423 A1 | 6/2014 | Heyes | |
| 2014/0260239 A1 | 9/2014 | Genter | |
| 2015/0121862 A1 | 5/2015 | Wade et al. | |
| 2015/0159660 A1 | 6/2015 | Kares et al. | |
| 2015/0176519 A1 | 6/2015 | Lee | |
| 2015/0192078 A1 | 7/2015 | Martin et al. | |
| 2016/0090951 A1 | 3/2016 | Kim et al. | |
| 2018/0058308 A1 | 3/2018 | Clarke et al. | |
| 2018/0058352 A1 * | 3/2018 | Clarke .................. | F02B 37/001 |
| 2018/0258838 A1 * | 9/2018 | Clarke .................. | F02B 37/22 |
| 2019/0078518 A1 | 3/2019 | Yamase et al. | |
| 2019/0136749 A1 * | 5/2019 | Clarke ............. | F02M 35/10144 |
| 2019/0277186 A1 * | 9/2019 | Clarke .................. | F02D 31/003 |

OTHER PUBLICATIONS

Garrett, "Turbocharger Specs," http://turbochargerspecs.blogspot.com/2011_03_01_archive_html, 21 pages, Mar. 1, 2011.

Gizmag, "One Turbocharger Per Cylinder Concept," http://www.gizmag.com/go/5227/, 10 pages, Feb. 18, 2006.

Hot Rods and Cool Stuff, "Home of the Wild 8-Turbo V-8 'Pressure Cooker' Engine Build," https://web.archive.org/web/20121227140611/http://www.hotrodsandcoolstuff.com/enginebuild.html, 17 pages, Dec. 27, 2012.

International Application No. PCT/US2016/040362, International Search Report & Written Opinion, 27 pages, Dec. 19, 2016.

(56) References Cited

OTHER PUBLICATIONS

International Application No. PCT/US2017/049870, International Search Report & Written Opinion, 17 pages, Jan. 26, 2018.
Kane, Jack, "The Sound and the Fury," Race Engine Technology Magazine, Issue 36, 15 pages, Feb. 2009.
Ulrich, Lawrence, "Carmakers Find That Turbos Are a Powerful Path to Fuel Efficiency," The New York Times, 5 pages, Feb. 26, 2015.

* cited by examiner

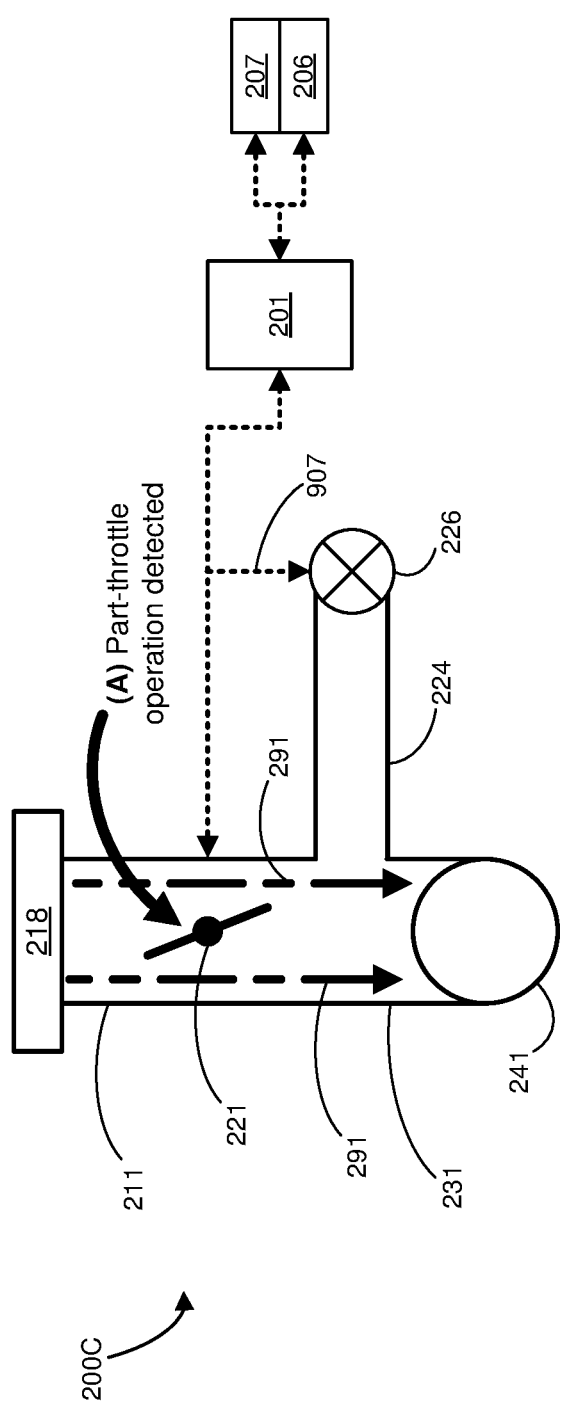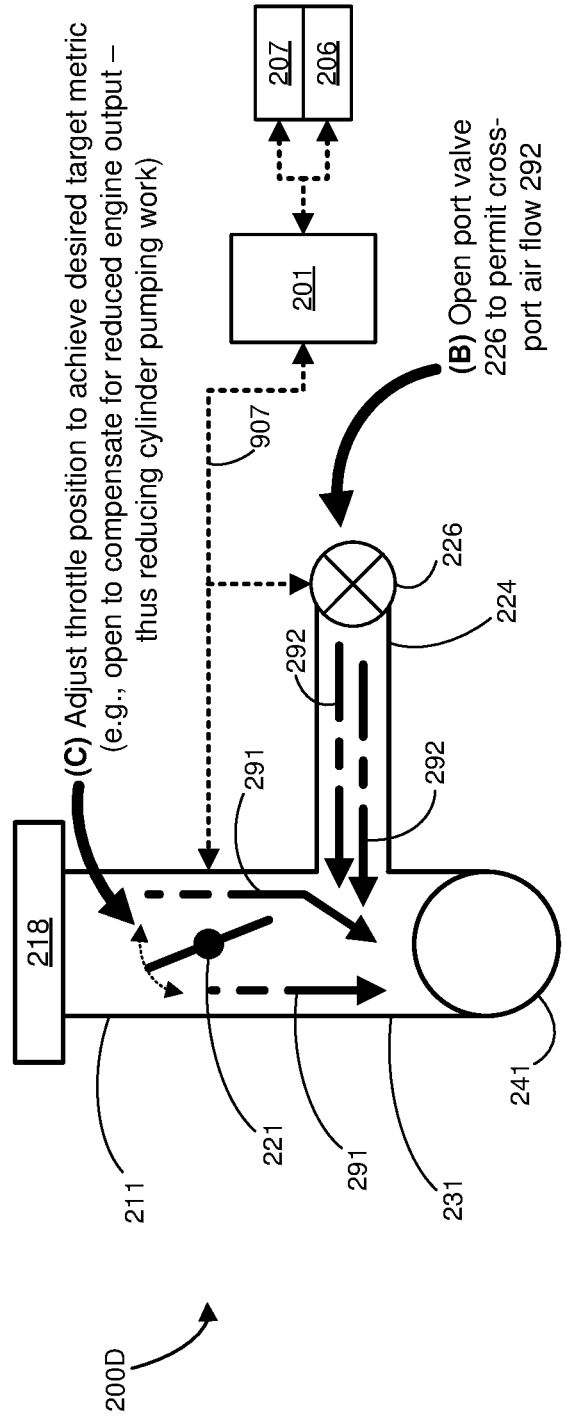
Figure 2C
Figure 2D

CROSS-PORT AIR FLOW TO REDUCE PUMPING LOSSES

RELATED APPLICATIONS

This application is a continuation of U.S. patent application Ser. No. 15/977,903, filed on May 11, 2018, entitled "CROSS-PORT AIR FLOW TO REDUCE PUMPING LOSSES," which is a continuation-in-part of U.S. Ser. No. 15/724,834, filed on Oct. 4, 2017, entitled "SYNERGISTIC INDUCTION AND TURBOCHARGING IN INTERNAL COMBUSTION ENGINE SYSTEMS," which is a continuation of U.S. patent application Ser. No. 15/467,708, filed on Mar. 23, 2017, now U.S. Pat. No. 10,087,823, issued Oct. 2, 2018, entitled "SYNERGISTIC INDUCTION AND TURBOCHARGING IN INTERNAL COMBUSTION ENGINE SYSTEMS," which is a continuation of U.S. patent application Ser. No. 15/254,138, filed on Sep. 1, 2016, now U.S. Pat. No. 9,638,095, issued May 2, 2017, entitled "SYNERGISTIC INDUCTION AND TURBOCHARGING IN INTERNAL COMBUSTION ENGINE SYSTEMS." Each patent application identified above is incorporated by reference in its entirety to provide continuity of disclosure and for all other purposes.

TECHNICAL FIELD

The disclosure relates to internal combustion engines and, more particularly, to an internal combustion engine using cross-port induction air flow to reduce pumping losses and improve fuel economy.

TECHNICAL BACKGROUND

Internal combustion engines drive pistons using a mixture of fuel and combustion air. The operation of the engine's combustion cylinders and the regulation of air flow in the intake apparatus of the engine can create pumping losses in certain circumstances. Such pumping losses can degrade engine performance and reduce fuel economy. Pumping loss in internal combustion engines is the power required to perform intake pumping during charge intake. During the intake stroke, the pressure acting on top of the piston is intake manifold pressure, minus whatever pressure losses occur as the intake charge passes through the intake port and valve.

Overview

Cross-port air flow that reduces pumping losses and improves engine fuel economy during part-throttle operation can be implemented in various types of internal combustion engine systems. In an engine system where the combustion air flow to combustion cylinders through intake ports is controlled using a per-cylinder or per-port mechanism (for example, one throttle per cylinder or one throttle per intake port), combustion air flow among and between the intake ports of different cylinders (for example, through intake-interconnecting port means such as "interconnection ports," "equalization ports," "equalization passages" and the like) provides a disruptive, cross-port combustion air flow that disrupts a primary combustion air flow through each intake port, which reduces pumping losses and improves fuel economy during part-throttle operation.

Filling inertia is present when combustion air travels at high velocity through an intake channel (for example, an intake runner and/or intake port) toward a cylinder intake valve. Cross-port air flow is used to slow down this high velocity, cylinder-filling air flow. As the high velocity filling air flow decelerates it creates higher pressure, which results in better filling of the combustion cylinder.

When an engine system operates in a selected operating mode (for example, part-throttle operation that permits a primary combustion air flow through an intake port and/or intake runner to a cylinder intake valve), cross-port air flow is used to disrupt the high velocity primary combustion air flow, thus reducing the air velocity flowing through and from a throttle to a cylinder intake valve. Reduced pumping losses are achieved using the cross-port air flow as follows: (a) when one or more ports or the like interconnecting different cylinders' intake ports are opened to permit cross-port air flow between cylinders' combustion air intakes, the cylinder filling inertia is reduced due to the reduction in air flow velocity caused by the disrupting cross-port air flow; (b) the reduced filling inertia lowers the charge density for the combustion chamber being filled; (c) the lower charge density reduces the torque developed in the cylinder by the combustion process; (d) to develop the same desired engine output, the induction system throttle must be opened further; (e) the larger induction system throttle opening reduces cylinder vacuum; (f) the reduced cylinder vacuum reduces induction system pumping work; and (g) this reduced pumping work improves fuel economy. Thus, providing cross-port air flow during part-throttle operation has the technical effect of reducing pumping losses and pumping work, as well as improving fuel efficiency.

When interconnecting port means (for example, valve-regulated ports) permit cross-port air flow, it significantly disrupts the inertia impact of cylinder filling. This results in lower charge density, which develops less power. The engine compensates for this by further opening one or more of the throttles, thereby reducing the pumping work that the engine has to overcome. Implementations of such cross-port air flow will be explained in connection with various engines and engine system types (e.g., synergistic and non-synergistic engine systems), but cross-port air flow to reduce pumping losses is not limited to any particular engine system type(s). The synergistic engine system is provided as a non-limiting exemplary engine in which implementations of cross-port air flow to reduce pumping losses can be utilized in combination with one or more additional functions performed by some of the same engine system components. Of note, the identical structure used in some implementations of synergistic engine systems for sharing combustion air flow during idle operation can be used in combination with cross-port air flow to reduce pumping losses during part-throttle operation of an engine system.

Cross-port sharing of combustion air between intake ports of an engine's combustion cylinders includes providing combustion air flow through ports interconnecting different cylinders' intake ports downstream of their per-port and/or per-cylinder combustion air flow control mechanisms (for example, a throttle controlling air flow through each intake port and/or to each individual combustion cylinder). In some implementations, combustion air flow through these intake-interconnecting equalizing ports can be controlled using valves in the ports. In some implementations such equalization ports can be closed during some of the engine's wide-open throttle operation to assist in driving combustion air into the cylinders during intake using filling inertia, while in some implementations the equalization ports are open during idle operation to permit sharing of combustion air for smooth idling. When such engine implementations operate in a part-throttle mode (that is, in an operational range between idle operation and wide-open throttle operation), the equalization ports interconnecting different cylinders' intakes are open, allowing disruptive, cross-port combustion air sharing. An individual throttle regulating air flow through each intake port and/or to each cylinder controls combustion air flow to the cylinders during part-throttle operation.

Implementations of cross-port induction providing reduced pumping losses and improved fuel economy are explained herein in connection with one or more engine system types, but these illustrative examples do not limit the types of engines to which cross-port air flow to reduce pumping losses can be applied and scope of cross-port induction systems described herein. For example, cross-porting to reduce pumping losses neither requires nor prevents turbocharging of any kind, and thus cross-port air flow can be implemented in engine systems other than synergistic engine systems (including engine systems using similar porting and valving as those used as idle air flow ports and valves that provide even combustion air flow during idle operation in synergistic and other engine systems). Moreover, while combustion air flow through each cylinder's intake port(s) is controlled on a per-cylinder or per-port basis in cross-port air flow examples, the air flow controlling mechanisms (for example, throttles) are not required to be affixed in close proximity to their respective cylinders' intake valves.

In internal combustion engine systems utilizing cylinders having only one intake port, a throttle can be affixed to control air flow through the individual intake port. In engine systems utilizing cylinders having two or more separate intake ports for each cylinder, a throttle can be affixed to control air flow through each intake port or affixed to control air flow through all intake ports supplying air to an individual cylinder. Multiple-port throttles in a cylinder's induction system can be operated in unison (i.e., so that all throttles are either open or closed) or can be operated in a bifurcated or other manner. In some implementations bifurcated operation of the throttles can include opening only one throttle per cylinder in some conditions.

In both single-intake-port and multiple-intake-port implementations, the ports providing cross-port air flow also can be used to provide generally even distribution of combustion air during idle mode operation of the engine system. These ports can be passages interconnecting intake ports and allowing air flow between intake valves of the combustion cylinders and may, in some implementations, include valves configured to prevent air flow through the ports under certain conditions. As noted herein, these ports can thus be utilized for at least two functions—disruptive cross-port air flow to reduce pumping losses during part-throttle operation, and idle operation combustion air distribution.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 2C illustrates one or more internal combustion engine system combustion cylinder assemblies.
FIG. 2D illustrates one or more internal combustion engine system combustion cylinder assemblies.

DETAILED DESCRIPTION

Implementations of methods, apparatus, systems and techniques to reduce pumping losses through the use of cross-port induction air flow can be utilized in various types of internal combustion engine systems. Pumping losses are reduced and fuel economy improved during part-throttle operation through the controlled sharing of combustion air between different cylinders' intake ports through interconnecting port means, such as intake-interconnecting combustion air flow ports. When such intake-interconnecting ports (for example, valve-controlled equalizing ports and the like) are open, the resulting cross-port air flow significantly disrupts the inertia impact of filling the cylinder. This results in lower charge density, which develops less power. The engine compensates for this by opening the throttle valves, thereby reducing the pumping work that the engine has to overcome.

Various types of engines and engine systems can benefit from cross-port induction to reduce pumping losses, such engines and engine systems utilizing cross-port air flow means like those described herein, including (but not limited to) synergistic engines employing interactive induction and turbocharging systems. The non-limiting exemplary implementations of engine systems (synergistic and otherwise) discussed herein are non-limiting, illustrative examples of engine systems that can benefit from cross-porting of combustion air during part-throttle operation through ports interconnecting intakes. As noted herein, turbocharging and/or mounting of throttles in close proximity to intake valves is neither required for nor prevented by implementations of cross-port induction to reduce pumping losses.

Figure 1:
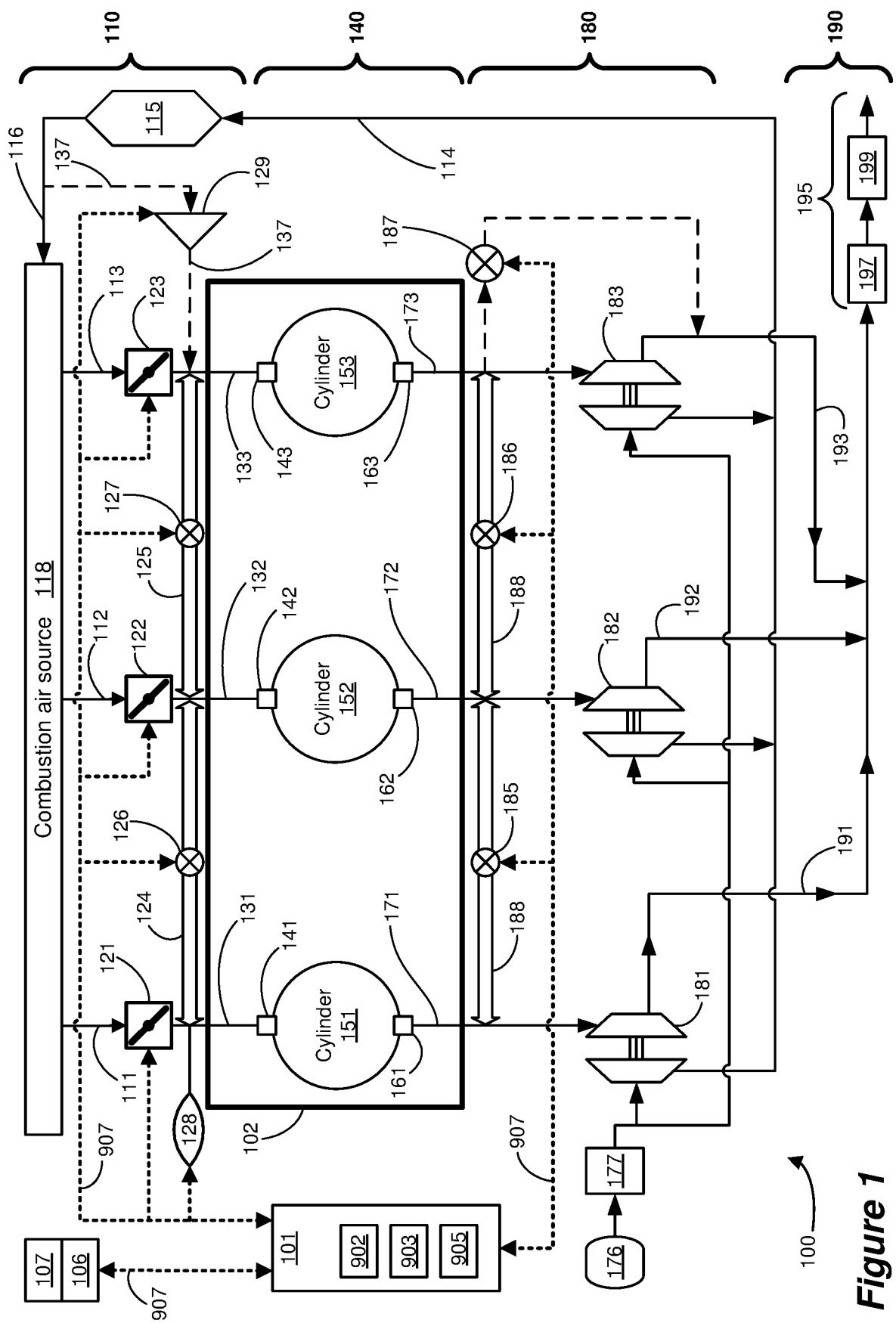
FIG. 1 illustrates an internal combustion engine system.

As seen schematically in FIG. 1, an internal combustion engine system 100 includes an induction system 110 providing combustion air to a combustion cylinder array system 140, which in turn discharges exhaust gas to drive an optional turbocharging system 180, which then delivers the exhaust gas to an exhaust system 190. In some implementations a portion of the exhaust gas can be used in an exhaust gas recirculation (EGR) system. Throttle mechanisms 121, 122, 123, each comprising one or more individual throttles, are provided for the combustion cylinders in engine system 100 to regulate combustion air flow in each cylinder intake port and to provide approximately atmospheric pressure at the upstream surface of the throttle plates (each throttle optionally may be operationally affixed in close proximity to each cylinder's intake valve system, which typically consists of either one intake valve or two intake valves).

In FIG. 1 several combustion cylinders 151, 152, 153 are housed within and/or defined by a cylinder block and a cylinder head 102 that also typically defines a plurality of intake ports 141, 142, 143 and exhaust ports 161, 162, 163 for the cylinders. Each cylinder is configured to contain a piston driven by periodic combustion of a mixture of fuel and combustion air (the charge). Moreover, each cylinder has a cylinder displacement that is defined as the area of the cylinder bore times the piston stroke in the cylinder.

Figure 2A:
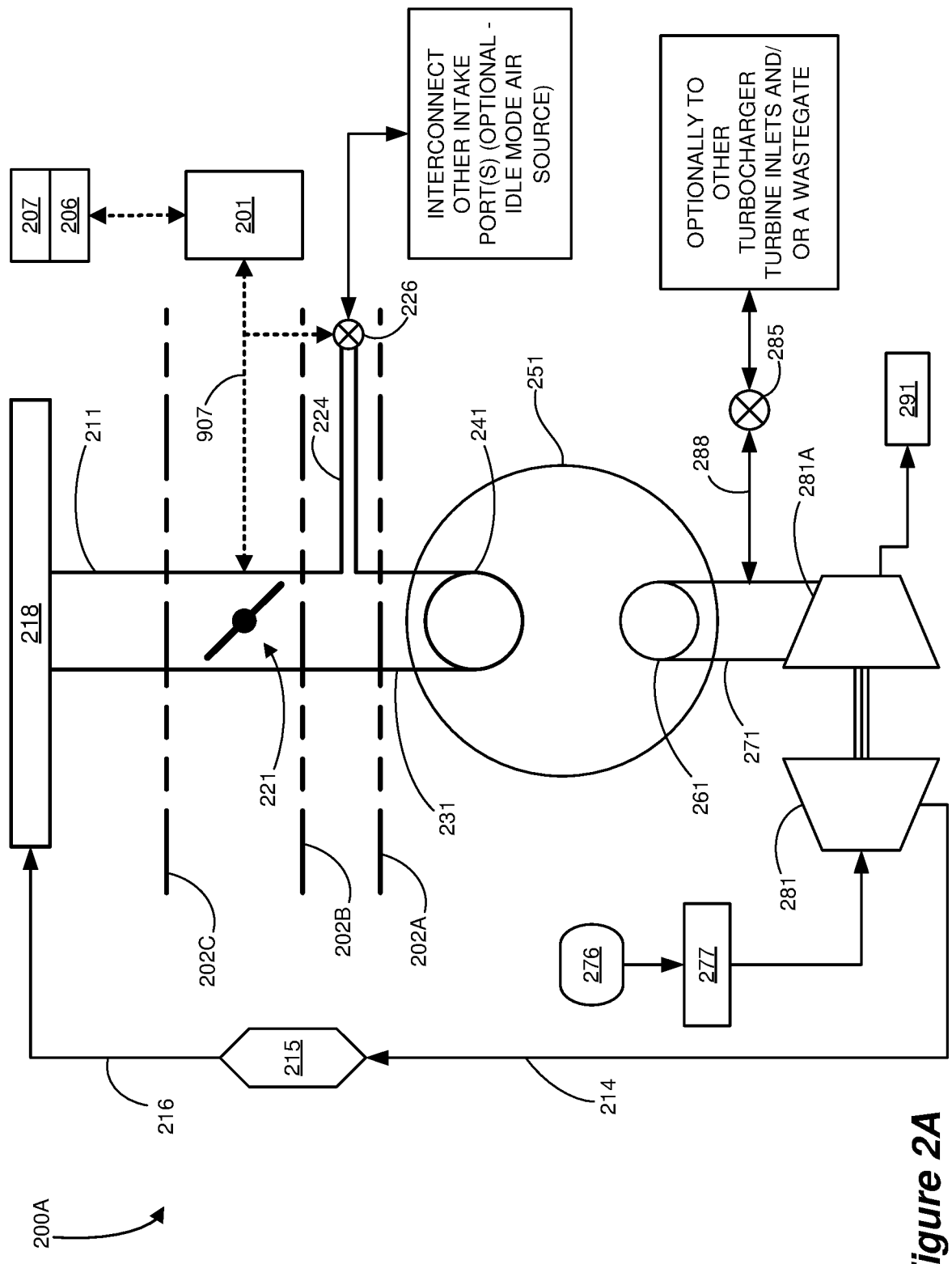
FIG. 2A illustrates one or more internal combustion engine system combustion cylinder assemblies.
Figure 2B:
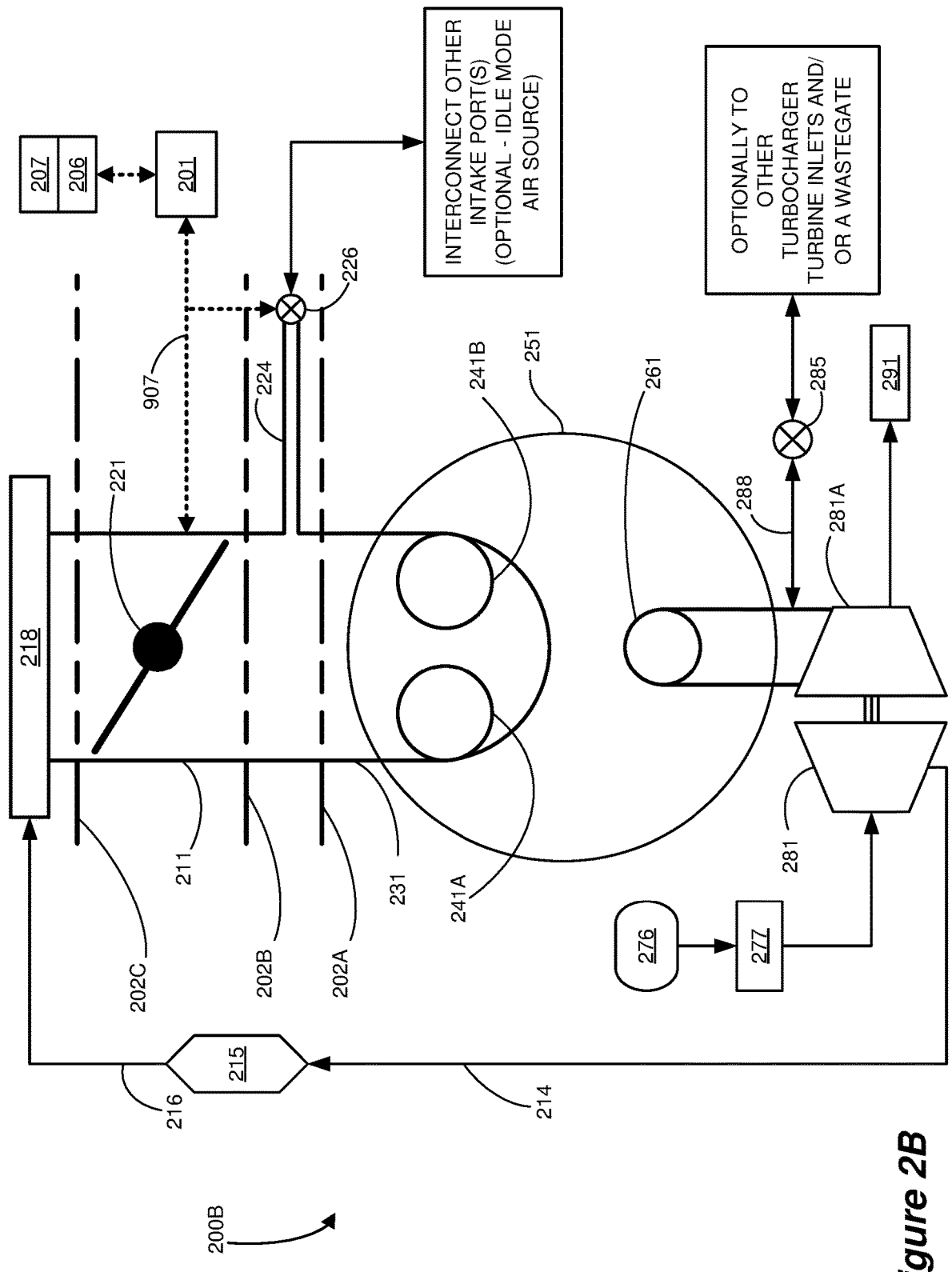
FIG. 2B illustrates one or more internal combustion engine system combustion cylinder assemblies.
Figure 3:
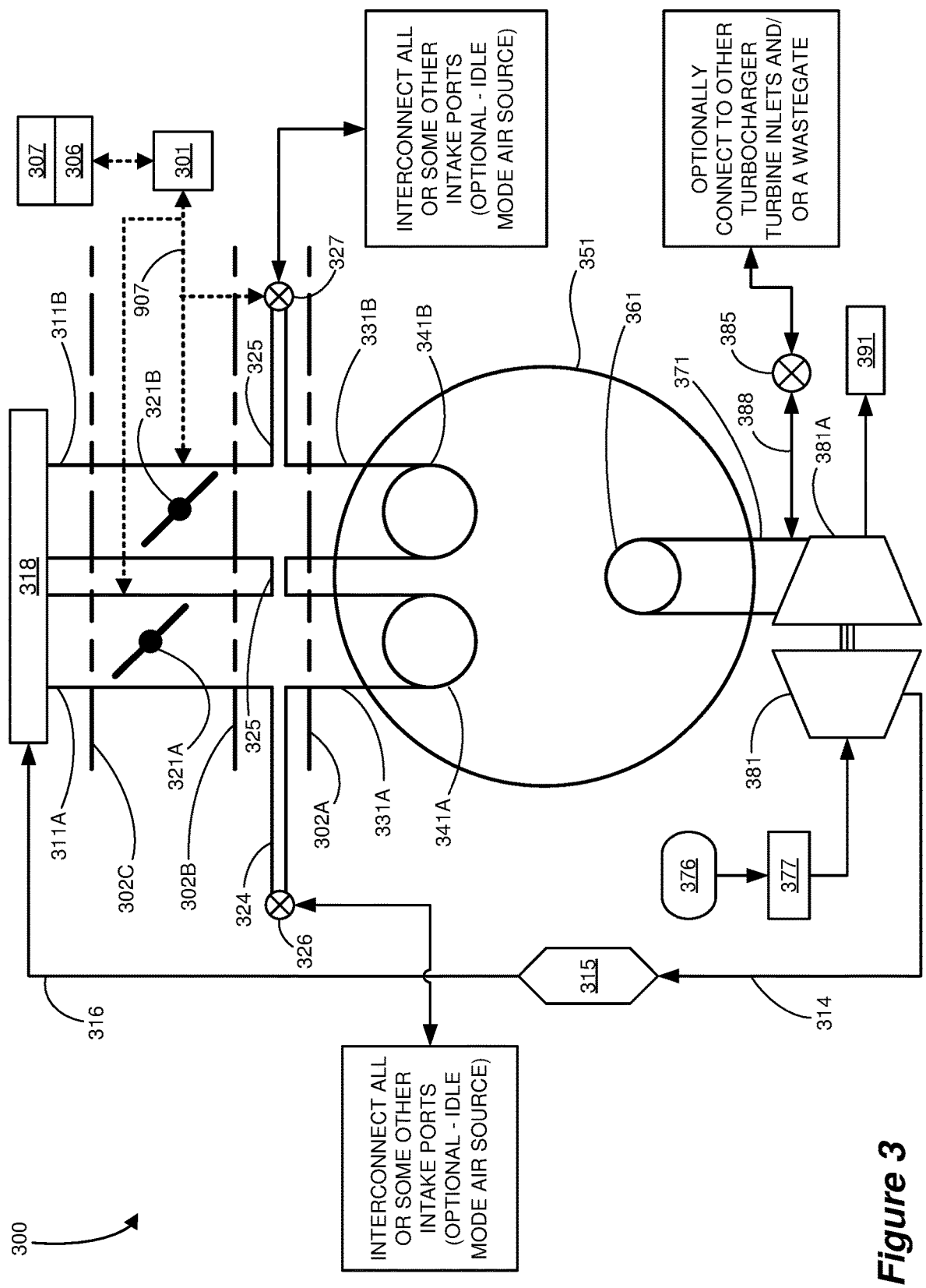
FIG. 3 illustrates one or more internal combustion engine system combustion cylinder assemblies.

Three non-limiting examples of cylinder intake configurations (comprising intake ports and intake valves) are shown to assist in describing non-limiting, illustrative examples of cross-port air flow to reduce pumping losses. In a first cylinder intake configuration shown in FIG. 2A, each combustion cylinder has a single intake port that provides combustion air to an intake valve system having a single intake valve that controls the admission of combustion air into the cylinder. As shown in FIG. 2A, intake port 231 supplies combustion air to cylinder 251 through a single intake valve 241. In a second cylinder intake configuration shown in FIG. 2B, each combustion cylinder has a single intake port but utilizes two or more intake valves in the intake valve system to control combustion air flow into the cylinder. As shown in FIG. 2B, intake port 231 supplies combustion air to cylinder 251 through two intake valves 241A and 241B. In a third illustrative configuration shown in FIG. 3, each cylinder has two intake ports, each of which supplies combustion air to a distinct intake valve system, each of which has a single intake valve controlling combustion air admission into the cylinder (i.e., the two intake ports and two intake valves provide two distinct intake channels (combustion air supply paths)). As shown in FIG. 3, intake port 331A supplies combustion air to cylinder 351 through intake valve 341A and intake port 331B supplies combustion air to cylinder 351 through intake valve 341B. Therefore, in the configurations of FIGS. 2A and 2B, a single intake port supplies combustion air to an intake valve system that can have one or two (or more) intake valves, respectively. In the configuration of FIG. 3, each cylinder has two intake valve systems, one for each intake port supplying combustion air to the cylinder. Engine systems in which these configurations and their associated implementations of cross-port air flow to reduce pumping losses can be used include spark-ignited engines having two or more combustion cylinders. A cylinder's intake channel includes an intake port that supplies combustion air to the cylinder intake valve system(s) plus any runner(s) or other combustion air pathway connected to the intake port for supplying combustion air from the combustion air source 118 to the cylinder. Each cylinder also has an exhaust valve system that includes at least one exhaust valve that controls the discharge of exhaust gas from the cylinder to an exhaust channel.

In FIG. 1, combustion cylinder 151 has an intake valve system that includes one or more intake valves 141 connecting cylinder 151 to a combustion air source 118 via a combustion air intake channel (e.g., intake runner(s) 111 and intake port(s) 131, where at least one intake port 131 is defined inside cylinder head 102 and an intake runner 111 is external to the cylinder head 102, though variations of this are well known and can be implemented herein). In some implementations the intake ports and exhaust ports of the combustion cylinders are defined by the cylinder head 102. A throttle mechanism 121 for cylinder 151 includes one or more throttles, each of which is operationally mounted (to or within a runner 111, to or within an intake port 131, or at the interface between an intake runner 111 and an intake port 131). Each throttle may include a throttle plate (or similar component) affixed to control combustion air flow to its associated intake valve system, such as intake valve(s) 141 of cylinder 151's intake valve system. Each throttle plate (or similar component) can be fixed on a shaft that is rotatably mounted in the walls of an intake channel that can comprise an intake port, intake runner and/or other intake passage to control the flow of air by movement. Each throttle can be switched between at least one idle position, at least one part-throttle position, and at least one wide-open throttle position.

Each throttle is operationally mounted to control combustion air flow through one of the intake ports. Thus, in intake valve systems having a single intake port servicing a single cylinder, there is a single throttle controlling combustion air flow through that intake port (e.g., in FIGS. 2A and 2B). Where multiple intake ports independently supply combustion air to a cylinder (e.g., in FIG. 3), there may be an individual throttle for each such intake port. Throttles can be operated in unison in a given engine system. The throttles also can be operated independently or in a staged manner, grouping throttles into subsets that are operated in a coordinated manner appropriate for the desired performance characteristics of the engine system. In some implementations each throttle 121, 122, 123 can be defined by a throttle body or housing that includes operational mounting of a throttle plate just upstream of a connection point for one or more of ports 124, 125. In other implementations the connection points for ports 124, 125 may be distinct from the throttle structures.

Exhaust gas is discharged from combustion cylinder 151 via an exhaust valve system 161 that includes one or more exhaust valves controlling exhaust gas discharge to an exhaust channel (e.g., exhaust port 171). The discharged exhaust gas can be delivered as appropriate, for example to an exhaust system (e.g., comprising a catalytic converter and muffler), to an EGR system, or to drive one or more turbochargers 181.

Similar routing of combustion air can be implemented with regard to cylinder 152 (using an intake channel having intake runner(s) 112 and intake port(s) 132, a throttle mechanism including one or more throttles 122, and an intake valve system having one or more intake valves 142) and with regard to cylinder 153 (using an intake channel having intake runner(s) 113 and intake port(s) 133, a throttle mechanism including one or more throttles 123, and an intake valve system having one or more intake valves 143). Implementations of cross-port induction air flow to reduce pumping losses can be implemented in synergistic and non-synergistic engine systems having 2 or more combustion cylinders and descriptions of and references to Figures having three cylinders are non-limiting examples.

In some implementations interconnecting port means include a plurality of combustion air flow ports 124, 125 interconnect the cylinders' intake ports 131, 132, 133. These interconnecting ports 124, 125 can perform one or both of at least two functions—cross-port sharing of combustion air between cylinders' intake ports during part-throttle operation to reduce pumping losses, and generally uniform distribution of combustion air to the cylinder intake ports during idle mode operation of the engine system 100. Ports 124, 125 also can help to accommodate differing amounts of throttle leakage when the one or more throttles per cylinder are closed (such leakage may lead to unstable engine idle mode operation). Each port 124, 125 comprises a proportionally-sized passage (e.g., chosen based on engine characteristics for one or more of the following—to provide cross-port air flow during part-throttle operation, to provide desired idle mode combustion air flow and distribution, and/or to remove the effects of throttle leakage (which typically differ from throttle to throttle) when the throttles are closed). Each port 124, 125 also can comprise a port valve 126, 127 that controls air flow through its respective port. In implementations where interconnecting ports are used for cross-port air flow to reduce pumping losses, the dimensions of the ports connecting intake ports can be selected to provide desired performance characteristics with regard to idle air distribution, throttle leakage and/or desired part-throttle pumping loss reduction. Different cross-sectional areas and other port attributes can provide various combustion air flow characteristics during different engine operation modes. The port and/or valve specifications can be selected in some cases after calibrating and/or other operational testing or evaluation of a given engine and its desired performance characteristics. In some implementations valves 126, 127 can be mounted to control air flow through interconnecting ports 124, 125. Valves 126, 127 can be binary (i.e., either completely open or completely closed), though adjustable position valves permitting partial opening/closing of the interconnection/equalizing ports 124, 125 may be used.

In FIG. 1 intake-interconnecting port 124 connects combustion cylinder 151's intake port (e.g., having a connection point at intake runner 111 and/or intake port 131) to combustion cylinder 152's intake port (e.g., having a connection point at intake runner 112 and/or intake port 132), where the port connections can be placed just downstream of their respective throttles 121 and 122 and upstream of respective intake valves 141 and 142 of combustion cylinders 151 and 152, respectively. Similarly, intake-interconnecting port 125 connects combustion cylinder 152's intake port (e.g., having a connection point at intake runner 112 and/or intake port 132) to combustion cylinder 153's intake port (e.g., having a connection point at intake runner 113 and/or intake port 133) just downstream of their respective throttles 122 and 123 and upstream of the respective intake valves 142 and 143 of combustion cylinders 152 and 153, respectively. Ports 124, 125 can be unrestricted or uncontrolled open passages or may utilize valves 126, 127 or other flow control devices that can open and close ports 124, 125 to control air flow through ports 124, 125. In addition to cross-port air flow to reduce pumping losses during part-throttle operation, ports 124, 125 can be employed during idle operation (where very small air flows provide conditions for more substantial pressure and flow differences that can destabilize idle operation). Under wide-open throttle acceleration modes it may be advantageous to harvest peak pressures during induction filling which will have a ramming effect, increasing charge density and subsequent engine output (e.g., by closing ports 124, 125 to prevent cross-port air flow). During part-throttle operation, open ports 124, 125 (referred to as a combustion air flow interconnection ports, interconnecting ports, equalization ports, equalizing ports and the like) can permit combustion air to flow from one cylinder to another (for example, from the intake port 132 of cylinder 152 to the intake port 131 of cylinder 151, and/or from the intake port 132 of cylinder 152 to the intake port 133 of cylinder 153) to reduce pumping losses. When valves 126, 127 are open, combustion air is allowed to flow between cylinders 151, 152, 153 during filling, significantly disrupting the inertia impact of cylinder filling. This results in lower charge density, which develops less power. The engine 100 compensates for this by opening the throttles 121, 122, 123, thereby reducing the pumping work that the engine 100 has to overcome.

One or more sensors 128 can be connected to the cylinder array (and/or other components of the engine system 100) to provide operational and other data to an engine control unit (ECU) or the like (e.g., engine control system 101). For example, combustion air temperature and pressure can be measured and supplied to engine control system 101 to permit proper air-to-fuel ratios for optimal or desired combustion characteristics (e.g., charge density is dependent upon temperature and density of the combustion air used). Thus air pressure (and/or other conditions and/or data) during idle mode operation, part-throttle operation, wide-open throttle operation and/or in other operating conditions can be monitored, detected, measured, etc., and any data thus obtained can be utilized accordingly. In FIG. 1 engine control system 101 includes one or more processors 902, memory 903 and one or more interfaces 905. Engine control system 101 can also include circuitry such as the circuitry used in an engine control unit (ECU) as well as collected and stored data and other aspects of engine mapping. As disclosed herein, various systems, apparatus, methods, etc. can be implemented in connection with such an engine control system, for example, through data processing and control logic that depends on one or more engine system parameters and/or conditions. Sensors and the like can transmit data to engine control system 101 using interfaces and links, after which engine control system 101 can generate control commands, signals and the like to various engine system components (sensor and/or other types of data can be collected and control signals deployed via communication lines 907, non-limiting examples of which are shown in the Figures). As is known to those skilled in the art, an ECU or similar control system can be configured to receive a variety of inputs (e.g., pressure, temperature, mass air flow, vehicle operator actions and inputs, engine speed and/or load) and to control a variety of functions and components (e.g., throttle control system(s), valves, air flow controls, exhaust gas controls, turbochargers, wastegates, etc.).

An idle mode combustion air supply line 137 can be connected to at least one of the cylinders' combustion air intake channels (e.g., runner 113 or intake port 133) downstream of any throttle associated with that air intake channel (e.g., at the same connection point as port 124 or 125). Combustion air flow through line 137 can be regulated or otherwise controlled by a throttle bypass valve 129 that selectively regulates the flow of combustion air (e.g., from combustion air source 118 and/or line 116) through ports 124 and 125 to the intake valves 141, 142, 143 when engine system 100 operates in idle mode. The combustion air is provided at a level that permits smooth idling while the three throttles 121, 122, 123 are closed.

During idle operation of engine system 100, all three throttle mechanisms 121, 122, 123 are closed and combustion air is fed to intake valves 141, 142, 143 through line 137 via ports 124 and 125 (e.g., port valves 126 and 127, if used, may be open when the engine system operates in idle mode). When engine system 100 transitions to wide-open throttle operating mode, all three throttle mechanisms 121, 122, 123 are completely open and combustion air is fed to intake valves 141, 142, 143 through intake ports 131, 132, 133 only (e.g., port valves 126 and 127 being closed when the engine system operates in wide-open throttle mode in certain conditions and implementations). When engine system 100 detects that it is operating between idle and wide-open throttle modes, this can be considered as detecting part-throttle operation (e.g., as determined by engine control system 101 based on input from the accelerator pedal 106, brake pedal 107, one or more sensors, and/or other data sources and/or indicators). During such part-throttle operation, as described herein, the three throttle mechanisms 121, 122, 123 are partially open and combustion air passing through the throttle mechanisms is fed to intake valves 141, 142, 143 through intake ports 131, 132, 133 with combustion air provided as well through ports 124, 125 (e.g., port valves 126 and 127 being opened when the engine system operates in part-throttle operating mode).

Exhaust gas is delivered to exhaust system 195 via exhaust lines 191, 192, 193 (e.g., to undergo treatment by a catalytic converter 197 and muffler 199 prior to release to the atmosphere, or for use in an EGR system); this can occur after exhaust gas drives optional turbochargers 181 (if any). Air cleaner 176 and mass air flow meter 177 can supply air to any optional turbochargers 181. In some implementations air from an intercooler 115 can be delivered to combustion air source 118, which can be an intake manifold or the like upstream of the throttle mechanisms 121, 122, 123.

In wide-open throttle operating mode, a synergistic engine system implementation of engine system 100 can provide combustion air to combustion cylinders 151, 152, 153 at approximately atmospheric pressure immediately, avoiding the delay due to induction system filling time and low-density charging in some implementations. If present, turbocharging system 180 can ramp up faster than earlier turbocharging systems due to the higher-density charging and, in some implementations, due to turbochargers 181 being mounted in close proximity to exhaust valves 161, 162, 163 of cylinders 151, 152, 153. In some implementations turbochargers 181 also can be low-inertia turbochargers that provide improved start-up performance (e.g., because of smaller turbine wheel and compressor wheel dimensions and/or lighter-weight materials). Moreover, because initial filling of the cylinders during wide-open throttle operation uses denser air and charges (in some cases due at least in part to the throttle mechanisms 121, 122, 123 optionally being mounted in close proximity to the cylinder intake valves 141, 142, 143), initial combustion in the cylinders generates larger volumes of exhaust gas that likewise get turbochargers generating compressed air more quickly.

FIG. 2A illustrates one or more non-limiting examples of combustion assembly 200A that include a combustion cylinder 251 and various components, systems, etc. used to operate an internal combustion engine system having multiple combustion cylinder assemblies implementing cross-port induction air flow to reduce pumping losses during part-throttle operation. The engine system 200A in this non-limiting example contains a number of similar combustion cylinder assemblies and accompanying cylinders, only one being shown in FIG. 2A for clarity. A combustion air source 218 provides combustion air to a combustion air intake channel that may include intake runner 211 and intake port 231. A throttle mechanism includes a throttle plate 221 or the like operationally affixed within the intake channel to regulate or otherwise control air flow in and through intake port 231.

In some implementations of cross-port air flow to reduce pumping losses during part-throttle operation, interconnecting port means can include one or more ports 224 that are connected to multiple cylinders' air intake channels downstream of throttle plate 221 and upstream of intake valve 241, permitting cross-port air flow between cylinder intake valves during part-throttle operation of engine system 200A. Ports 224 can interconnect the intake valves of a number of cylinders in a given engine. Opening and closing of each port 224 can be controlled by a valve 226 in some implementations. As can be seen in FIG. 2A, various cylinder head configurations for an internal combustion engine system utilizing combustion assembly 200A can be utilized, as illustrated by alternate cylinder head perimeters 202A, 202B and 202C.

If a cylinder head having border 202A is used, then port(s) 224 and throttle plate 221 are outside the cylinder head (e.g., having throttle plate 221 mounted within an intake runner 211, or having throttle plate 221 mounted between runner 211 and intake port 231, with port(s) 224 situated downstream of the throttle 221). Throttle plate 221 and port(s) 224 can be integrally mounted using a throttle body assembly or unitary component that has structure defining both the throttle plate 221 and each port 224, if desired. In some implementations port(s) 224 can be located or defined inside the cylinder head 202B (again, optionally being controlled by a valve 226 or the like). Such a configuration utilizing cylinder head 202B can permit mounting of a throttle directly to the cylinder head to further enhance its optional proximity to cylinder intake valve 241 (or, in the case of multiple intake valves, as shown in FIG. 2B, optionally in close proximity to the multiple intake valves 241A and 241B).

Finally, both the throttle plate 221 and port(s) 224 can be contained within (e.g., integrated inside) the cylinder head 202C. The choice of whether to have port(s) 224 and/or throttle plate 221 inside the cylinder head can be determined on the basis of a number of factors. During part-throttle operation, port(s) 224 can permit combustion air to flow to or from the intake port 231 of cylinder 251 to reduce pumping losses. When valve 226 is open and allows combustion air to flow during filling to intake port 231 of cylinder 251, that cross-port air flow significantly disrupts the inertia impact of filling the cylinder 251. This results in lower charge density, which develops less power. Engine system 200A compensates for this by further opening the throttle 221, thereby reducing the pumping work that the engine has to overcome.

If an optional synergistic engine system is implemented, throttle 221 is operationally affixed in close proximity to the intake valve 241 of cylinder 251, which proximity can be measured as a linear separation between the two components, can be measured by volume (e.g., where the throttle-to-intake volume defined between throttle 221 and intake valve 241 is less than or equal to 80% or 60% of the displacement of cylinder 251), and/or by other means. Again in the optional implementation of a synergistic engine system, turbine inlet 281A of turbocharger 281 can be affixed in close proximity to any exhaust valve(s) 261 of cylinder 251, in some implementations being mounted directly to a cylinder head or otherwise being mounted to or quite near exhaust port 271. In some non-limiting exemplary synergistic engine system implementations, a balancing passage 288 and optional balancing valve 285 can be connected to exhaust port 271 to permit sharing of exhaust gas between and among turbochargers before being sent to an exhaust and/or EGR system 291 in an internal combustion engine system utilizing combustion assembly 200A. Alternatively, valve 285 can be replaced with a wastegate in some implementations. Balancing passages 288 and valves like valve 285 can interconnect the turbine inlets of a number of cylinders' turbochargers in a given engine to permit exhaust gas sharing. Air from air cleaner 276 and mass air flow meter 277 is compressed by turbocharger 281. The compressed air can be sent via line 214 to an intercooler 215, which supplied source 218 with compressed air via line 216.

As noted, some cylinder configurations utilize a single intake port that supplies combustion air to a cylinder through multiple intake valves. FIG. 2B illustrates a non-limiting example of this alternate configuration in a combustion assembly 200B that is otherwise similar to combustion assembly 200A of FIG. 2A, except that intake port 231 supplies air to cylinder 251 through an intake valve system having two intake valves 241A and 241B, instead of a single intake valve. The operation of assembly 200B is the same as that described in connection with assembly 200A of FIG. 2A in all other pertinent aspects. In some engine system operations various operational patterns (that is, uniform and/or non-uniform opening and closing) of multiple intake valves like 241A and 241B of FIG. 2B might be available and can be used in connection with implementations of cross-port air flow to reduce pumping losses.

FIG. 3 illustrates further improvements available using implementations of cross-port air flow to reduce pumping losses during part-throttle operation in a combustion assembly 300 in which the combustion cylinder 351 has two intake valves 341A, 341B, each of which receives combustion air through a separate, independent intake port 331A, 331B, respectively. That is, intake port 331A supplies combustion air to cylinder 351 through intake valve 341A, but not through intake valve 341B, and intake port 331B supplies combustion air to cylinder 351 through intake valve 341B, but not through intake valve 341A. Combustion air source 318 thus supplies combustion air to cylinder 351 via two distinct combustion air intake channels. Intake runners 311A, 311B can be used to connect source 318 to intake ports 331A, 331B, respectively. A throttle mechanism includes throttle plate 321A affixed in close proximity to intake valve 341A and throttle plate 321B affixed in close proximity to intake valve 341B. Ports 324, 325 can be connected downstream of throttles 321A and 321B and upstream of intake valve 341A and 341B, again providing cross-port air flow during part-throttle operation and a generally even distribution of combustion air to intake valves 341A and 341B to permit smooth engine idling when throttles 321A and 321B are closed (and, in some implementations, to compensate for any irregular throttle leakage when the throttles are closed). Ports 324, 325 interconnect intake ports 311A, 311B with other cylinders' intake ports, as shown. Positioning of throttles 321A, 321B and ports 324, 325 can be made relative to alternate cylinder head configurations 302A, 302B, 302C. Combustion air flow through ports 324, 325 can be controlled by valves 326, 327 in some implementations. Opening and closing of throttles 321A and 321B can be controlled by engine control system 301 using inputs and data from various sources (e.g., accelerator pedal 306 and brake pedal 307, as well as others). During part-throttle operation, ports 324, 325 can permit combustion air to flow from one cylinder to another (for example, to one or both of the intake port 311A, 311B of cylinder 351) to reduce pumping losses. With valve 326 and/or valve 327 open, combustion air is allowed to flow to cylinder 351 during filling, significantly disrupting the inertia impact of filling cylinder 351. This results in lower charge density, which develops less power. The engine 300 (for example, using engine control system 301) compensates for this by opening the throttle valve 321A and/or 321B, thereby reducing the pumping work that the engine 300 has to overcome.

A non-limiting, exemplary illustration of the disruptive nature of cross-port air flow is shown in FIGS. 2C and 2D, one operational sequence of which is designated by the reference letters (A) through (C), which depict generalized combustion air flow from combustion air source 218 through the intake runner 211 and intake port 231 of assembly 200A of FIG. 2A. As those skilled in the art will appreciate, similar implementation can be made in connection with assembly 200B of FIG. 2B and assembly 300 of FIG. 3, as well as other configurations. In FIG. 2C, a high velocity primary combustion air flow 291 is created when throttle 221 is opened. This primary air flow develops filling inertia and passes through intake valve 241 to fill a cylinder prior to combustion. In FIG. 2C valve 226 is closed and thus no cross-port air flow is permitted between intake port 231 and any other cylinder's intake port. Detection (A) of part-throttle operation (e.g., in some implementations detection by engine control system 201 based at least in part on data received from accelerator pedal 206) results in the opening (B) of valve 226 in FIG. 2D. The opening of valve 226 permits cross-port (secondary) air flow 292 through interconnecting port 224 to disruptively impact primary combustion air flow 291 through intake port 231. This disruptive impact reduces the charge density in the cylinder and system 200D compensates for this by having engine control system 201 or the like adjust (C) throttle 221 to increase the primary combustion air flow 291 (e.g. to meet or at least get closer to a target engine operation metric or the like).

In optional synergistic engine system implementations engine system 300 according to FIG. 3, the higher volume exhaust gas generated in cylinder 351 drives optional turbocharger 381, which may have a turbine inlet 381A affixed in close proximity to cylinder exhaust valve(s) 361 (e.g., via exhaust port 371). In some implementations one or more balancing passages 388 and optional balancing valves 385 can interconnect exhaust port 371 with one or more additional exhaust ports to permit sharing of exhaust gas between and among turbochargers before being sent to an exhaust and/or EGR system 391 in an internal combustion engine system utilizing combustion assembly 300. Alternatively, valve 385 can be replaced with a wastegate in some implementations. Air from air cleaner 376 and mass air flow meter 377 is compressed by turbocharger 381 and is sent via line 314 to an intercooler 315, and then on to source 318 via line 316. The availability of two throttles 321A, 321B for cylinder 351 in combustion assembly 300 provides options for various modes of combustion air delivery to cylinder 351. Cylinders having separate, independent intake ports and intake valves can have throttle mechanisms operating either in unison (that is, all opening and closing together) or in stages or groups comprising subsets of throttles that open and close according to the control of engine control system 301 and the like.

Internal combustion engine systems such as those discussed herein can be operated in different modes to achieve various engine performance characteristics. Such internal combustion engine systems can be operated in the different operational modes described in the following matrix applicable to engines utilizing two intake ports per cylinder (e.g., idle operation, part-throttle acceleration, wide-open acceleration, braking deceleration, and part-throttle deceleration):

| Operational mode | Throttle #1 in each cylinder | Throttle #2 in each cylinder | Idle air bypass | Interconnect port valves |
|---|---|---|---|---|
| Idle | Closed | Closed | Open | Open |
| Part-throttle acceleration | Part-open | Closed | Closed | Open |
| Wide-open throttle acceleration | Open | Calibrated | Closed | Torque-dependent |
| Part-throttle deceleration | Part-open | Closed | Calibrated transition between open and closed | Open |
| Braking deceleration | Closed | Closed | Open | Open |

The open/closed state of the interconnection valves is torque-dependent in some implementations because the valves may stay closed until peak torque is achieved, after which they are opened to achieve peak horsepower. Other configurations and operational sequences may also be implemented.

Figure 4A:
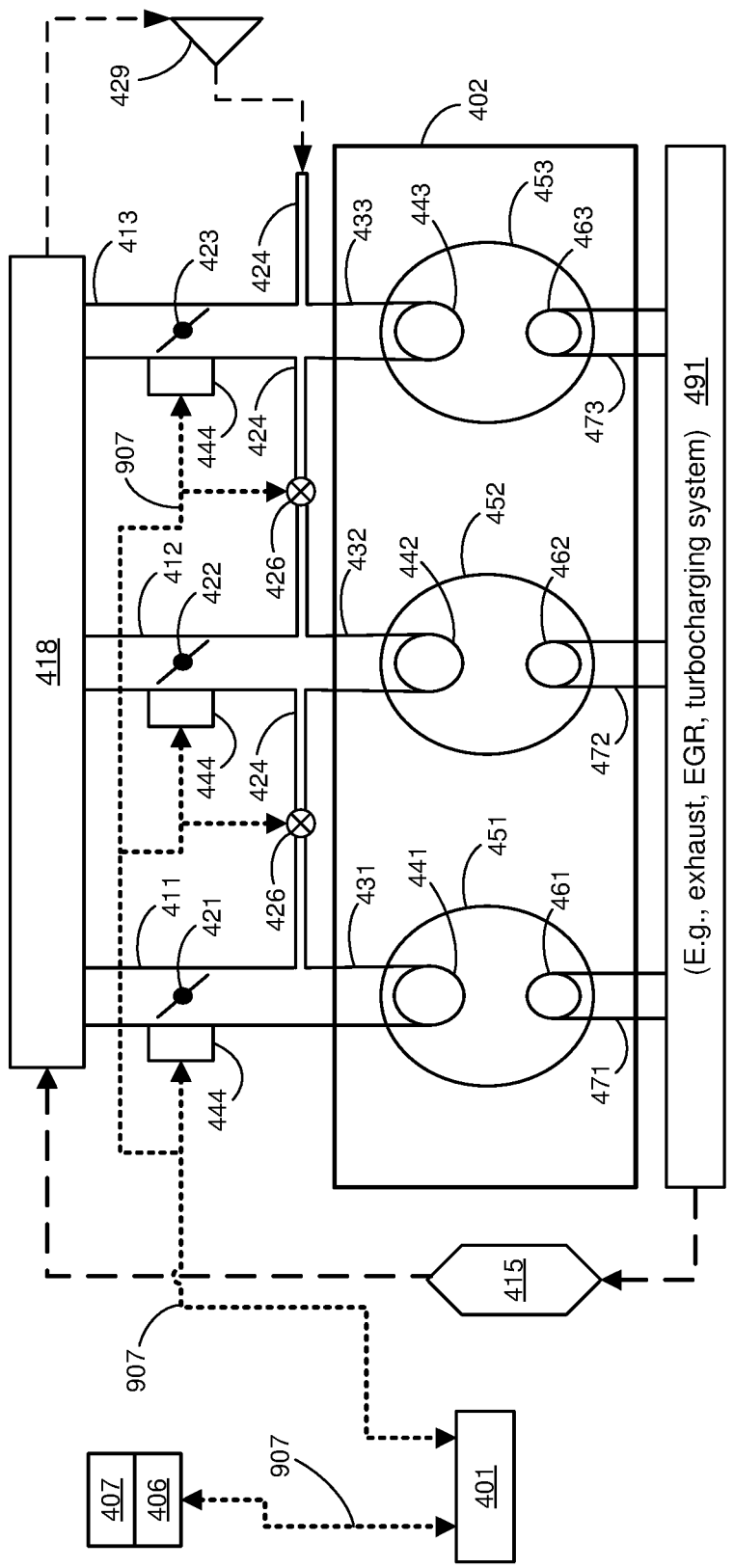
FIG. 4A illustrates an internal combustion engine system.

FIG. 4A illustrates one or more implementations of throttle control for an internal combustion engine system implementing cross-port air flow to reduce pumping losses during part-throttle operation (some components of engine system 400A have been omitted, however components such as those shown in connection with FIGS. 1, 2A and/or 2B may be used). The system 400A of FIG. 4A optionally may be a synergistic engine system (e.g., utilizing turbochargers and mounting throttles in close proximity to their associated intake valves) or may be a "non-synergistic engine system" that operates in a different manner. Features specific to synergistic engine systems (e.g., turbocharging, throttles in close proximity to intake valves, etc.) are neither required nor prevented by implementations of cross-port air flow to reduce pumping losses during part-throttle operation.

A combustion air source 418 supplies combustion air to air intake channels (e.g., a primary combustion air flow through intake runners 411, 412, 413 and intake ports 431, 432, 433). Single throttles 421, 422, 423 control combustion air flow in intake channels for cylinders 451, 452, 453, respectively. Admission of combustion air from the intake channels to cylinders 451, 452, 453 is regulated by the opening and closing a single intake valve 441, 442, 443 in each cylinder 451, 452, 453, respectively (cylinders 451, 452, 453 may include multiple intake valves, examples of which are shown in FIG. 2B, and the description of the components and operation of engine system 400A in FIG. 4A may be adapted to such cylinder configurations as well). Throttles 421, 422, 423 optionally may be affixed in close proximity to their associated intake valves in some implementations, but such close proximity affixation is not required for cross-port air flow to reduce pumping losses during part-throttle operation. A suitable exhaust system 491 (which may include optional turbocharging) is configured to receive exhaust gas from the cylinders 451, 452, 453. Compressed air from any turbocharging can be supplied to combustion air source 418, through intercooler 415 in some implementations.

Implementations of engine system 400A include ports 424 configured to provide a secondary combustion air flow (e.g., cross-port air flow) during part-throttle operation (and, optionally, to provide even distribution of combustion air to cylinders 451, 452, 453 when throttles 421, 422, 423 are closed and the engine is operating in idle mode). In some implementations cross-port air flow during part-throttle operation (and any combustion air flow during idle operation) can be further controlled using valves 426 in ports 424. The supply of combustion air to ports 424 during idle operation may be controlled by an idle mode air valve 429 or the like, which can act as a throttle bypass solenoid. In FIG. 4A, idle operation of engine system 400A can allow for smooth firing of the engine's combustion cylinders through the use of combustion air bypass 429 that feeds combustion air from combustion air source 418 through ports 424 (with valves 426 open). Valves 426 are kept open during idle operation in some implementations to allow a generally even flow of combustion air to the intake valves of all cylinders. If engine system 400A transitions to wide-open throttle operation, then valves 426 may close to enable hyper-filling of the cylinders with combustion air flow from source 418 in synergistic engine systems. However, if system 400A operates in a part-throttle mode, valves 426 are kept open.

Throttles 421, 422, 423 and/or ports 424 can be integral to a cylinder head 402 in some implementations. In FIG. 4A each cylinder's throttle mechanism (including throttles 421, 422, 423) and port valves 426 are controlled by an engine control system 401 (e.g., an ECU), which can receive various inputs and other data from engine system 400A and a vehicle in which engine system 400A operates. Among these inputs and data include signals from a vehicle accelerator pedal 406 and a vehicle brake pedal 407. The position of each throttle 421, 422, 423 is controlled by a throttle control system that includes an individual actuator 444 controlling each throttle 421, 422, 423. Actuators 444 can be electrical, electronic, electromechanical, magnetic, mechanical or any other suitable device that can control the opening and closing of throttle plates and/or other throttle mechanisms in an engine system (e.g., an electromechanical device including a stepping motor that can change throttle position and being controlled by a control signal or the like, for example from an engine control unit). Generally, many throttle actuators are sensor-based and controllable so that they can regulate the position and rate of change of a throttle being controlled and can provide various types of data to an engine control unit or the like.

During idle operation, engine system 400A may operate with all of the throttles 421, 422, 423 closed and valves 426 open (permitting combustion air distribution to intake valves 441, 442, 443). When the vehicle operator steps on the accelerator pedal 406, engine control system 401 signals actuators 444 to open throttles 421, 422, 423. If the engine control system 401 receives wide-open throttle operation indications, then valves 426 close in some implementations and wide-open throttle operation ensues. Ports 424 and valves 426 of system 400A provide the ability to reduce pumping losses and improve fuel economy through the management of air flow when engine system 400A operates between idle operation and wide-open throttle operation (referred to as "part-throttle operation"). When ports 424 remain open for combustion air flow during part-throttle operation, combustion air is delivered to a given cylinder through that cylinder's own partially-open throttle controlling air flow from combustion air source 418 via the cylinder's intake port, but also from the intake port(s) of one or more other cylinders in the engine system, thus providing (a) additional air flow cross-sectional area and (b) disruptive cross-port air flow from one or more directions generally directed across the linear air flow created by the cylinder's own throttle in its part-throttle position. The larger effective cross-sectional area for air flow into a cylinder and the disruptive nature of the cross-port flow reduce pumping losses and improve fuel economy during part-throttle operation (that is, operational states that are neither idle operation nor wide-open throttle operation).

When engine control system 401 detects part-throttle operation based on the position of accelerator pedal 406 and/or other data, then cross-port air flow (secondary combustion air flow) to reduce pumping losses can be performed as described herein. If valves 426 are closed when part-throttle operation is detected, these valves 426 are then opened. One or more engine operation metrics may be measured (e.g., one or more engine performance metrics and/or engine output metrics in the form of engine power, engine torque, engine speed, vehicle speed) to determine if one or more target engine operation metrics is/are being met. If a target is not being met as measured, then throttle positions can be adjusted to enable engine system 400A to meet the target(s). For example, the throttles 421, 422, 423 can be opened further (e.g., via control of engine control system 401) to reduce cylinder vacuum and thus reduce pumping work.

Figure 4B:
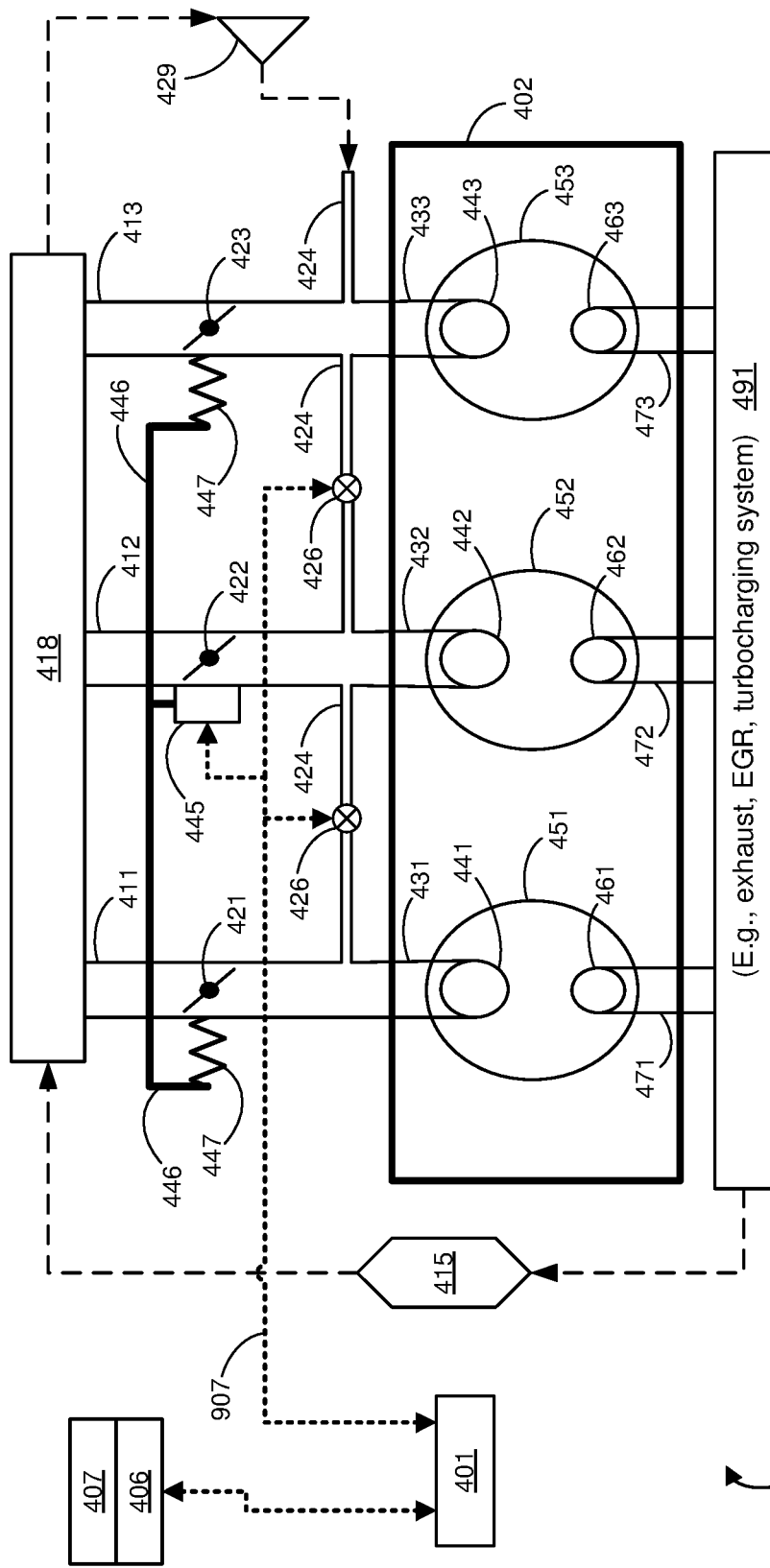
FIG. 4B illustrates an internal combustion engine system.

FIG. 4B illustrates one or more implementations of cross-port air flow to reduce pumping losses during part-throttle operation (some components of engine system 400B have been omitted, however components such as those shown and discussed in connection with FIGS. 1, 2A and/or 2B may be used). The operation of engine system 400B is similar to that of system 400A of FIG. 4A, except for implementation of a different throttle control structure and operation. Instead of having individual actuators for each throttle, engine system 400B utilizes a throttle control system comprising a single actuator 445 mounted to throttle 422. As with actuators 444 of FIG. 4A, operation of actuator 445 is controlled by engine control system 401. However, in addition to directly controlling throttle 422, actuator 445 is mechanically linked to throttles 421 and 423 using linkage 446, which is thus operationally connected to the respective throttle plates. This linkage 446 can include biasing means 447 (e.g., springs) that bias throttles 421, 423 into and/or to maintain their closed positions. Operating throttles 421, 422, 423 with a common actuator employing spring and/or other biasing thus helps to ensure closure of multiple throttles in system 400B. The throttle-closing bias compensates for variations in the closed positions of the throttle plates in each throttle mechanism, allowing each to be completely closed while all are operated by a common actuator. This reduces the total throttle leakage, improving operation of a throttle bypass solenoid 429 to achieve and maintain stable idle mode engine operation (e.g., by maintaining a stable RPM).

Figure 4C:
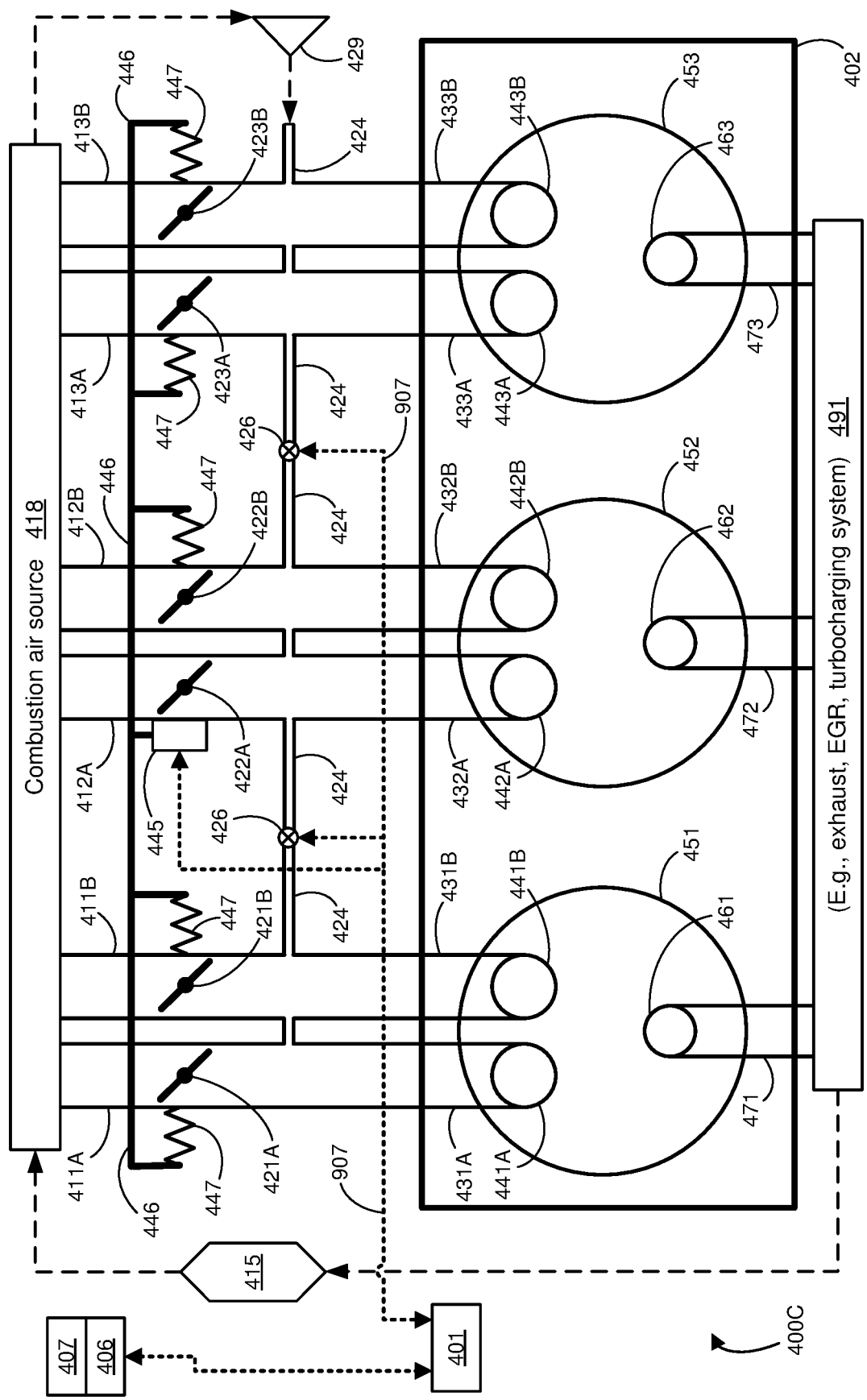
FIG. 4C illustrates an internal combustion engine system.

FIG. 4C illustrates one or more implementations of cross-port air flow to reduce pumping losses during part-throttle operation (again, as with engine systems 400A and 400B, some components may be omitted, however components such as those shown and discussed in connection with FIGS. 1, 2A, 2B and 3 may be used). The operation of engine system 400C is similar to that of system 400B of FIG. 4B, except that engine system 400C has combustion cylinder assemblies comprising cylinders 451, 452, 453 that utilize multiple intake valves 441A, 441B, 442A, 442B, 443A, 443B; more specifically, each combustion cylinder's intake valve system has two intake valves, each of which is individually supplied with combustion air via an independent intake channel. In the non-limiting example of FIG. 4C there are a total of six throttles 421A, 421B, 422A, 422B, 423A, 423B regulating combustion air flow through the intake runners 411A, 411B, 412A, 412B, 413A, 413B and intake ports 431A, 431B, 432A, 432B, 433A, 433B to cylinders 451, 452, 453. Each cylinder has a throttle mechanism that includes two throttle plates or the like, each of which controls air flow through an individual intake channel connected to a single intake valve. In some implementations cross-port air flow to reduce pumping losses during part-throttle operation with multiple-intake-valve cylinders, the throttles may be operated in unison (i.e., all throttles are closed and partially or completely opened identically). The use of a single actuator for each throttle can be employed (similar to the implementation(s) shown in FIG. 4B). FIG. 4C illustrates a throttle control system that includes a common actuator 445 using a linkage 446 (e.g., a mechanical linkage) and biasing means 447 (e.g., springs) to link all throttles 421A, 421B, 422A, 422B, 423A, 423B and thus produce matched opening (wide-open and partial-open positions) and closing of those throttles.

Figure 4D:
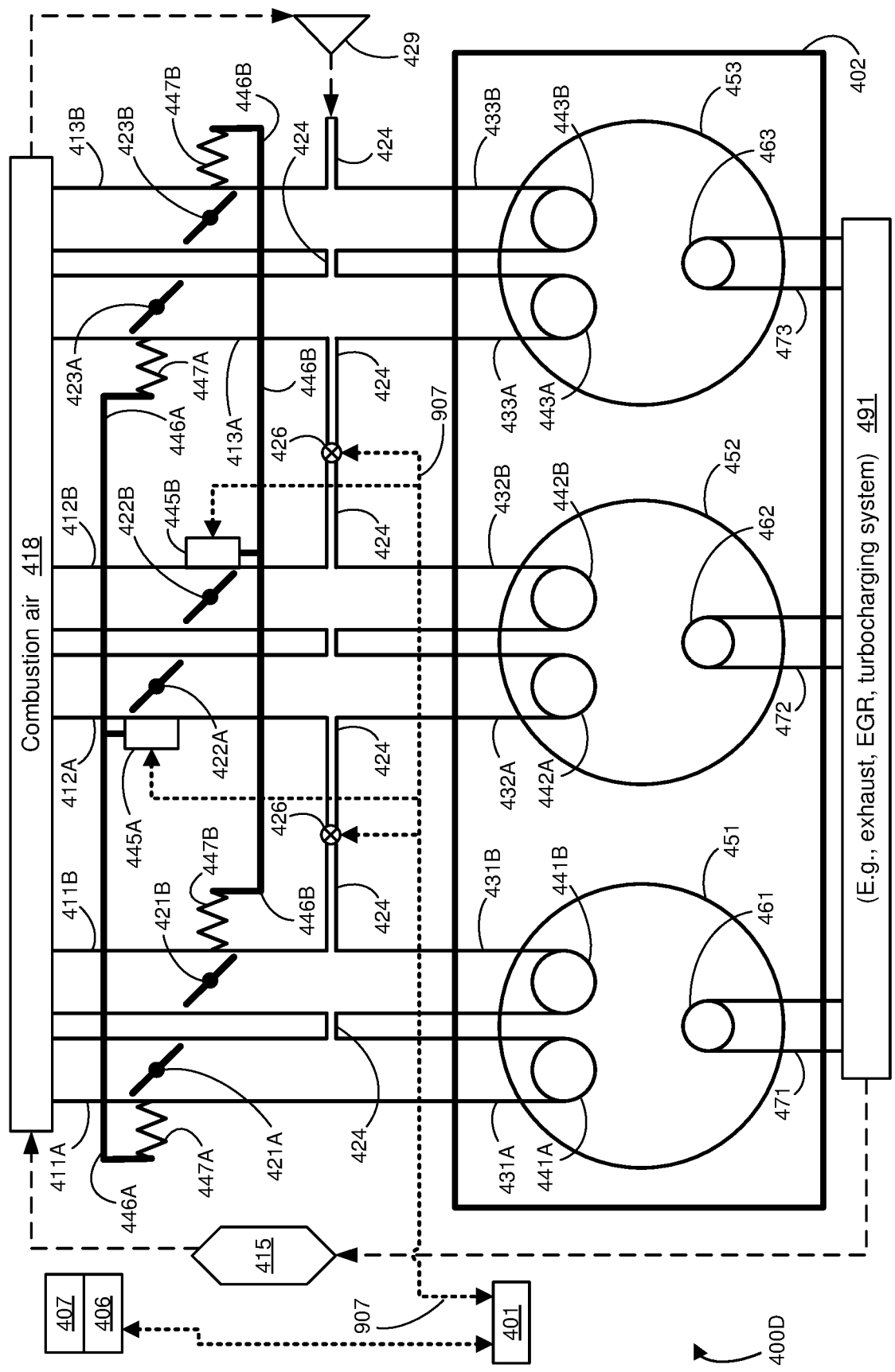
FIG. 4D illustrates an internal combustion engine system.

FIG. 4D illustrates one or more implementations of cross-port air flow to reduce pumping losses during part-throttle operation of an engine system 400D (again, as with engine systems in FIGS. 4A-4C, some components may be omitted, however components such as those shown and discussed in connection with FIGS. 1, 2A, 2B and 3 may be used). The operation of engine system 400D is similar to that of system 400C of FIG. 4C in that cylinders 451, 452, 453 of engine system 400D utilize multiple intake valves 441A, 441B, 442A, 442B, 443A, 443B; more specifically, each combustion cylinder's intake valve system has two intake valves, each of which is individually supplied with combustion air via an independent intake channel. In the non-limiting example of FIG. 4D there are a total of six throttles 421A, 421B, 422A, 422B, 423A, 423B regulating combustion air flow (primary combustion air flow) through the intake runners 411A, 411B, 412A, 412B, 413A, 413B, respectively, and intake ports 431A, 431B, 432A, 432B, 433A, 433B, respectively, to cylinders 451, 452, 453, respectively. Each cylinder has a throttle mechanism that includes two throttle plates or the like, each of which controls air flow through an individual intake channel connected to a single intake valve. In some implementations of cross-port air flow to reduce pumping losses during part-throttle operation with multiple-intake-valve cylinders, the set of all engine throttles may be operated in subsets, groups or in a staged manner (i.e., all throttles do not close and/or open identically).

Implementations of part-throttle operation including cross-port air flow to reduce pumping losses illustrated in FIG. 4D utilize staged opening and/or closing of throttles using multiple actuators and linkages that permit opening a subset of the individual throttles to achieve staged induction. FIG. 4D illustrates a throttle control system that includes a first actuator 445A and its associated linkage 446A (including biasing means 447A, which in some implementations can be a spring or the like) configured to control operation of a first subset that includes throttles 421A, 422A, 423A to produce uniform opening and closing of throttles within the first subset. Likewise, a second actuator 445B and its associated linkage 446B (including biasing means 447B) are configured to control operation of a second subset that includes throttles 421B, 422B, 423B to produce uniform opening and closing of throttles within the second subset. During idle operation of engine system 400D, all throttles 421A, 421B, 422A, 422B, 423A, 423B can be closed. Combustion air for smooth idle operation is fed by valve 429 through interconnecting port means that includes ports 424 that interconnect the air intake channels of the cylinders (e.g., interconnecting the intake ports or interconnecting the intake runners) at a point downstream of the throttles and upstream of the intake valves. Effectively, ports 424 interconnect the intake ports of the cylinders (and, as noted in connection with FIGS. 2A, 2B and 3, ports 424 may or may not be integral to cylinder head 402).

In some implementations ports 424 only need to interconnect a single intake port for each cylinder. In FIGS. 4C and 4D, for example, ports 424 can also be configured to interconnect intake ports 431A, 432A and 433A to provide cross-port air flow (secondary combustion air flow) during part-throttle operation and, optionally, generally even distribution of combustion air during idle operation. This type of configuration avoids the need to interconnect intake ports of the same cylinder (e.g., intake ports 431A and 431B), which can simplify engine system configuration as well as avoiding any combustion air leakage between same-cylinder intake ports during simultaneous or non-simultaneous throttle operation (e.g., FIGS. 4C and 4D, respectively). This interconnection of only one intake port per cylinder may mean that not all of the intake-interconnecting ports illustrated in the Figures would be necessary. For example, in FIG. 3, ports 325 and valve 327 could be eliminated, leaving intake port 331A connected to only one other intake port for each cylinder in combustion assembly 300.

In some implementations when accelerator pedal 406 is depressed, actuator 445A controls opening of throttles and, through linkage 446A, throttles 421A, 422A, 423A are opened (e.g., to either a wide-open throttle position or to a part-throttle position). Actuator 445B may remain in its closed position, keeping throttles 421B, 422B, 423B closed (via linkage 446B and, in some implementations, biasing from means 447B that accommodates variations in throttles' closed positions to reduce or eliminate leakage when closed). Partial or complete opening of only one intake channel for each cylinder provides advantages over operational modes in which all throttles for all intake channels are controlled in unison. For example, with regard to cylinder 451, when actuator 445A and linkage 446A open throttle 421A (and throttle 421B remains closed), the velocity of combustion air flowing through intake port 431A and intake valve 441A might be substantially higher than it would be if both throttles 421A, 421B opened together. The cross-sectional area of only one intake port 431A thus leads to faster combustion air flow directed to cylinder 451, which may influence part-throttle operation cross-port air flow characteristics implemented in some engine systems. Minor leakage of combustion air through port 424 connecting intake runner 411A and intake runner 411B may have little or no effect on the filling of cylinder 451 through intake runner 411A and intake port 431A. Staged combustion air flow using a two-actuator-based control system per cylinder may assist in delivering more combustion air to the cylinders in a denser charge and thus yields higher power at low RPM, and it may need to be considered in implementing cross-port air flow to reduce pumping losses in the same configurations.

Pumping losses during part-throttle operation of system 400D are reduced by leaving open valves 426 to provide each cylinder with a larger effective cross-section of air flow. The open valve state presents a larger effective cross-sectional area through which combustion air can be drawn by each cylinder's piston during part-throttle operation.

As noted above, cross-port air flow to reduce pumping losses and improve fuel economy during part-throttle operation can be implemented in various types of internal combustion engine systems that include interconnecting intake port means, and is not limited to use solely in connection with synergistic engine systems described herein in connection with some limited, non-limiting exemplary implementations. In the non-limiting synergistic internal combustion engine system examples discussed herein, the cross-port induction air flow is provided through interconnecting port means, which can comprise one or more combustion air flow intake-interconnecting ports (also referred to as equalization ports, equalizing ports, equalizing passages and equalization passages in connection with some implementations), that interconnect different combustion cylinders' intake ports downstream of their per-port or per-cylinder throttle mechanisms, permitting combustion air to flow from one cylinder's intake port to a different cylinder's intake port (i.e., cross-port) during part-throttle operation to reduce pumping losses and improve fuel economy. Some interconnection ports may interconnect two intake ports for the same cylinder. This combustion air sharing using interconnecting ports can take place whenever the engine system operates in part-throttle mode—whether the engine has transitioned from idle to part-throttle operation or has transitioned from wide-open throttle to part-throttle operation. Moreover, cross-port air flow to reduce pumping losses can be implemented in engine systems that do not use the intake-interconnecting ports for idle operation combustion air distribution or any other purpose other than pumping loss reduction during part-throttle operation.

Throttles or other intake port combustion air flow control means are used to individually control each cylinder's intake combustion air flow. By interconnecting the different cylinders' intakes (for example, intake ports and/or intake runners), combustion air can be shared in a cross-porting air flow during part-throttle operation. The dimensions of the intake-interconnecting ports and/or other system components can be selected to provide desired performance characteristics with regard to idle air distribution, throttle leakage and/or desired part-throttle pumping loss reduction. Different cross-sectional areas and other port attributes can provide various combustion air flow characteristics during different engine operation modes. The port and/or valve specifications can be selected in some cases after calibrating, testing and/or other operational evaluation of a given engine and its desired performance characteristics. In some implementations these interconnection/equalizing ports have combustion air flow control valves that are binary (either completely open or completely closed), though adjustable position valves permitting partial opening/closing of the interconnection/equalizing ports may be used.

As noted above, some implementations of synergistic engine systems can utilize an equalization port apparatus in connection with the engine induction system (in some implementations of the synergistic engine system, this equalization port apparatus comprises passages and valves interconnecting throttled intake ports across multiple cylinders in the engine) to assist in reducing or eliminating perceptible turbo lag and boosting power during acceleration. Other internal combustion engine configurations can utilize the equalization apparatus described above as well. With regard to synergistic engine systems, the equalization ports can include valves that are open during idle operation to enable a generally even flow of combustion air to all cylinders, thus enabling smooth idle operation. Such equalization port valves can close the equalizing ports in a synergistic engine system when the engine transitions to wide-open throttle acceleration to enable synergistic/interactive induction and turbocharging performance.

Figure 5:
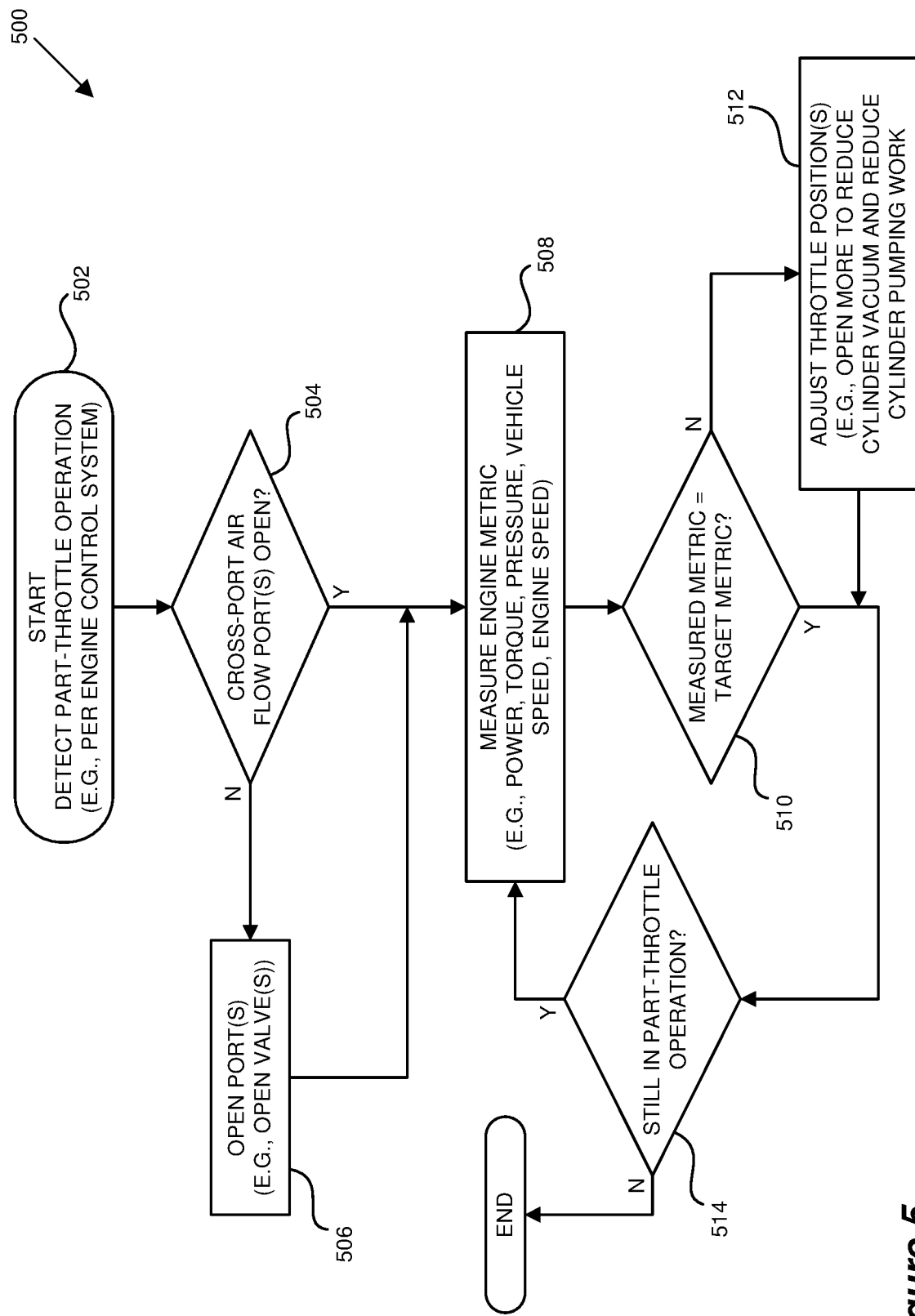
FIG. 5 illustrates a method of operation of an internal combustion engine system implementing cross-port induction to reduce pumping losses.

FIG. 5 illustrates one or more methods of operating an internal combustion engine implementing cross-port air flow (e.g., secondary combustion air flow) to reduce pumping losses and improve fuel economy. This method can be implemented, for example, in the engine systems of the Figures, as well as in others. When method 500 begins, part-throttle engine operation is detected at 502. Detection can be performed by an engine control system or the like and can be identified when the engine operates within a specified operational range, for example between idle operation and wide-open throttle operation, which can be defined as desired with regard to measured metrics (e.g., engine operation metrics) and the like. In some implementations the accelerator pedal and/or other engine system components, sensors, etc. can provide data used to detect idle operation, part-throttle operation and wide-open throttle operation. Detection may be made during a transition between operation modes (for example, transitioning from idle operation to part-throttle operation, or transitioning from wide-open throttle operation to part-throttle operation, or any other transition to part-throttle operation). Changes in engine operation can be initiated and/or controlled by a user (e.g., the operator of a vehicle in which the engine system operates), the engine control system and/or other operation change initiators. At 504 the ports controlling cross-port air flow between cylinders are checked to determine whether they are open; if not, then they are opened at 506. The flow of combustion air through these ports (referred to as equalization ports, equalizing ports, intake-interconnecting ports, interconnecting ports, interconnection ports and the like) may be controlled by one or more valves, as noted herein. Opening the ports at 506 may include opening one or more of these port valves.

At 508 an engine metric is measured (e.g., an engine operation and/or output metric). This measurement can include detecting a binary (e.g., on/off, yes/no) condition or measuring a quantity, rate or the like. In some implementations an engine operation and/or output metric may be measured (e.g., engine power output, and/or engine torque output, engine speed). Moreover, some other measured metric may be measured (e.g., air pressure measure at one or more locations in the engine, the speed of a vehicle in which the engine is operating and/or others). In some cases one or more measured metrics may be used in a formula, algorithm, etc. to calculate a figure on which throttle adjustments can be made. Because the combustion air flow interconnection ports are opened to permit cross-port combustion air sharing between the intake ports of different cylinders, the measured engine metric may not match at 510 a threshold or other target metric (also, the noted "metric" can be a combination of multiple metrics and/or factors, or can be the result of a calculation using one or more measured metrics). Cross-port air flow (secondary combustion air flow intersecting the primary combustion air flow through the throttle(s)) significantly disrupts the inertia impact of cylinder filling, which results in lower charge density in the cylinders, which requires the engine to open the throttles to offset the lower engine output (opening the throttles reduces the pumping work required). This can be reflected in the measured engine metric and its comparison to a target engine metric can inform the engine control system or other controller that engine operation has to be modified. The engine can compensate for this by further opening and/or otherwise adjusting one or more throttles at 512, for example opening throttles incrementally, to provide additional power. This adjustment reduces pumping losses and improves the fuel economy of the engine performing method 500. The process 500 can continue measuring the engine metric at 508 on an ongoing basis to maintain desired engine performance during part-throttle operation. If the engine ceases part-throttle operation at 514, the part-throttle control method can end.

Some implementations of cross-port induction air flow to reduce pumping losses during part-throttle operation might utilize a throttle mechanism comprising one or two throttle plates or the like optionally affixed in close proximity to a cylinder's intake valve system (comprising one or two intake valves). A throttle-to-intake volume can be identified between each cylinder's throttle mechanism and its intake valve system (i.e., the cylinder throttle mechanism is separated from the intake valve system by the throttle-to-intake volume). Where only one intake port regulates combustion air flow to a cylinder (e.g., FIGS. 2A and 2B), one throttle is used for that cylinder, and the throttle-to-intake volume is the volume separating that throttle from any intake valve(s) in that cylinder's intake valve system (where the throttle and intake valve(s) are closed). Where two separate intake ports regulate combustion air flow to a cylinder, two throttles are used for each cylinder (one throttle regulating air flow in each intake port), and that cylinder's total throttle-to-intake volume is the sum of the volumes that separate the throttles from their respective intake valves (that is, the sum of each intake channel between its throttle and its associated intake valve(s), as in FIG. 3), again where the throttles and intake valves are closed. It should be noted that in cylinders with multiple intake ports, each intake channel's throttle-to-intake volume does not have to be equal to the other(s), meaning that throttle plates for the same cylinder's intake can be affixed to define different volumes between the throttle plate and its associated intake valve system.

When a cylinder has a single intake valve supplied with combustion air by a single intake port, in some implementations a throttle affixed in close proximity to the intake valve system is operationally mounted to control combustion air flow through the intake port and so that the throttle-to-intake volume is less than or equal to 80% of the cylinder's displacement, where the throttle-to-intake volume is defined as the intake channel volume between the throttle plate and the intake valve when both are closed (where the intake channel volume may include intake port volume and intake runner volume, if any, between the closed throttle plate and closed intake valve, not including any equalizing port(s) volume). In other implementations, a throttle affixed in close proximity to the intake valve system having a single intake valve is operationally mounted so that the throttle-to-intake volume is less than or equal to 60% of the cylinder's displacement. In some implementations, a throttle plate affixed in close proximity to the intake valve system is operationally mounted to control combustion air flow through the intake port and so that the linear distance the combustion air travels from the throttle plate to the single cylinder intake valve is less than or equal to 10 inches, 8 inches, 6 inches, 4 inches or 2 inches.

When a cylinder has multiple intake valves supplied by a single intake port, in some implementations a throttle affixed in close proximity to the intake valve system is operationally mounted to control combustion air flow through the intake port and so that the throttle-to-intake volume is less than or equal to 80% of the cylinder's displacement. In other implementations, a throttle affixed in close proximity to multiple intake valves served by a single intake port is operationally mounted so that the throttle-to-intake volume is less than or equal to 60% of the cylinder's displacement. In some implementations, a throttle plate affixed in close proximity to multiple intake valves served by a single intake port is operationally mounted to control combustion air flow through the intake port and so that the linear distance the combustion air travels from the throttle plate to at least one of the cylinder intake valves is less than or equal to 10 inches, 8 inches, 6 inches, 4 inches or 2 inches.

When a cylinder has an intake valve system comprising a first intake valve supplied with combustion air by a first intake port and a second intake valve supplied with combustion air by a distinct second intake port (e.g., FIG. 3), in some implementations first and second throttles are affixed in close proximity to the intake valve system when the first throttle is operationally mounted to control combustion air flow through the first intake port and the second throttle is operationally mounted to control combustion air flow through the second intake port and so that the throttle-to-intake volume is less than or equal to 80% of the cylinder's displacement, where the throttle-to-intake volume is defined as the sum of (a) the first intake channel volume defined between the first throttle and the first intake valve when both are closed plus (b) the second intake channel volume defined between the second throttle and the second intake valve when both are closed. In other multiple-port implementations, first and second throttles are affixed in close proximity to the intake valve system when the throttle-to-intake volume is less than or equal to 60% of the cylinder's displacement. In some multiple-port implementations, first and second throttles are affixed in close proximity to the intake valve system when the linear distance the combustion air travels between each throttle and its associated intake valve is less than or equal to 10 inches, 8 inches, 6 inches, 4 inches or 2 inches. A throttle mechanism separated from a cylinder intake valve system by an intake manifold is not affixed in close proximity to that cylinder intake valve system.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. An internal combustion engine system comprising:
 a first cylinder assembly comprising:
  a first cylinder;
  a first intake valve controlling admission of combustion air to the first cylinder from a first intake port; and
  a first throttle plate operationally affixed to control combustion air flow into the first cylinder through the first intake port; and
 a second cylinder assembly comprising:
  a second cylinder;
  a second intake valve controlling admission of combustion air to the second cylinder from a second intake port; and
  a second throttle plate operationally affixed to control combustion air flow into the second cylinder through the second intake port;
 a first passage connecting the first intake port downstream of the first throttle plate to the second intake port downstream of the second throttle plate; and
 an engine control system, wherein the engine control system is configured to:
  control opening and closing of the first throttle plate;
  control opening and closing of the first intake valve; and
  detect part-throttle mode operation.

2. The system of claim 1 wherein the first passage is configured to direct a secondary combustion air flow to disrupt a primary combustion air flow through the first intake port from the first throttle plate to the first cylinder.

3. The system of claim 2 wherein the secondary combustion air flow is a cross-port air flow.

4. The system of claim 1 wherein the internal combustion engine system further comprises an idle air flow system comprising an idle air flow throttle bypass configured to direct combustion air to at least one of the following during idle operation of the internal combustion engine system: the first intake port downstream of the first throttle plate; the second intake port downstream of the second throttle plate; and/or the first passage.

5. The system of claim 1 wherein the internal combustion engine system further comprises: a third cylinder assembly comprising: a third cylinder; a third intake valve controlling admission of combustion air to the third cylinder from a third intake port; and a third throttle plate operationally affixed to control combustion air flow into the third cylinder through the third intake port; and a second passage connecting the second intake port downstream of the second throttle plate to the third intake port downstream of the third throttle plate.

6. The system of claim 1 wherein the internal combustion engine system further comprises a turbocharging system comprising a turbocharger configured to receive exhaust gas from one or both of the first and second cylinders; further wherein the first throttle plate is operationally affixed in close proximity to the first intake port and further wherein the second throttle plate is operationally affixed in close proximity to the second intake port.

7. A method of reducing pumping losses using cross-port air flow in an internal combustion engine system, wherein the internal combustion engine system comprises: a plurality of cylinder assemblies comprising a first cylinder assembly and a second cylinder assembly; the first cylinder assembly comprising a first throttle operationally affixed to control combustion air flow into a first cylinder through a first intake port; the second cylinder assembly comprising a second throttle operationally affixed to control combustion air flow into a second cylinder through a second intake port; an intake-interconnecting port system comprising: a first interconnecting port connecting the first intake port downstream of the first throttle to the second intake port downstream of the second throttle; and a first valve within the first interconnecting port; the method comprising: opening one or more interconnecting ports during part-throttle mode operation; opening the first throttle to compensate for reduced engine output caused by lower charge density in the first cylinder due to reduced filling inertia of the primary combustion air flow through the first intake port; wherein the reduced filling inertia is caused by the cross-port air flow; and further wherein opening the first throttle reduces cylinder vacuum in the first cylinder and thus reduces induction system pumping work and improves fuel economy.

8. The method of claim 7 wherein the internal combustion engine system further comprises a turbocharging system comprising a turbocharger configured to receive exhaust gas from one or both of the first and second cylinders.

9. The method of claim 8 wherein the first throttle is operationally affixed in close proximity to the first intake port and further wherein the second throttle is operationally affixed in close proximity to the second intake port.

10. The method of claim 7 further comprising detecting part-throttle mode operation of the internal combustion engine system, wherein detecting part-throttle mode operation of the internal combustion engine system comprises collecting data from a vehicle accelerator pedal.

11. The method of claim 7 wherein the method further comprises: measuring an engine operation metric; comparing the measured engine operation metric to a target engine operation metric; and adjusting the first throttle to reduce cylinder vacuum and reduce intake pumping work of the first cylinder assembly based on the comparison of the measured engine operation metric and the target engine operation metric.

12. The method of claim 11 wherein the measured engine operation metric comprises one of the following: measured engine power output; measured engine torque output; measured engine speed; and/or measured speed of a vehicle driven by the internal combustion engine system.

13. The method of claim 7 further comprising detecting part-throttle mode operation of the internal combustion engine system, wherein detecting part-throttle mode operation of the internal combustion engine system comprises collecting data from a vehicle accelerator pedal.

14. A method of reducing pumping losses using cross-port air flow in an internal combustion engine system, wherein the internal combustion engine system comprises: a plurality of cylinder assemblies comprising a first cylinder assembly and a second cylinder assembly; the first cylinder assembly comprising a first throttle operationally affixed to control primary combustion air flow into a first cylinder through a first intake port; the second cylinder assembly comprising a second throttle operationally affixed to control primary combustion air flow into a second cylinder through a second intake port; a first port connecting the first intake port downstream of the first throttle to the second intake port downstream of the second throttle; and a first valve within the first connecting port; the method comprising: operating the internal combustion engine system in part-throttle mode; opening the first valve during part-throttle mode operation to permit cross-port air flow from the second intake port to the first intake port through the first connecting port; opening the first throttle to compensate for reduced engine output caused by lower charge density in the first cylinder due to reduced filling inertia of the primary combustion air flow through the first intake port; wherein the reduced filling inertia is caused by the cross-port air flow; and further wherein opening the first throttle reduces cylinder vacuum in the first cylinder and thus reduces induction system pumping work and improves fuel economy.

\* \* \* \* \*

UNITED STATES PATENT AND TRADEMARK OFFICE
CERTIFICATE OF CORRECTION

PATENT NO. : 10,697,357 B2
APPLICATION NO. : 16/421134
DATED : June 30, 2020
INVENTOR(S) : James R. Clarke et al.

Page 1 of 1

It is certified that error appears in the above-identified patent and that said Letters Patent is hereby corrected as shown below:

On the Title Page

Page 3, (56), References Cited, add --Wiseco, "Wiseco Piston Sets For 1.8L Mazda Miata," https://web.archive.org/web/20150611041034/http://5xracing.com/i-11988983-wiseco-piston-sets-for-1-8l-mazda-miata.html, 2 pages, June 11, 2015--

Signed and Sealed this
Twenty-second Day of December, 2020

Andrei Iancu
*Director of the United States Patent and Trademark Office*